United States Patent
Grbac et al.

(10) Patent No.: US 8,036,987 B1
(45) Date of Patent: Oct. 11, 2011

(54) METHOD AND SYSTEM FOR ACCOUNTS PAYABLE PRIORITIZATION AND MANAGEMENT

(75) Inventors: Arno Grbac, West Newton, MA (US); Tara L. Tarapata, Andover, MA (US); Jana Beattie Eggers, Londonderry, NH (US)

(73) Assignee: Intuit Inc., Mountain View, CA (US)

( * ) Notice: Subject to any disclaimer, the term of this patent is extended or adjusted under 35 U.S.C. 154(b) by 297 days.

(21) Appl. No.: 12/361,386

(22) Filed: Jan. 28, 2009

Related U.S. Application Data

(63) Continuation-in-part of application No. 10/769,277, filed on Jan. 30, 2004, now abandoned.

(51) Int. Cl.
G06Q 40/00 (2006.01)
(52) U.S. Cl. .......................... 705/40; 705/42
(58) Field of Classification Search .................. 705/40, 705/75, 42, 30, 39, 26, 43; 235/380, 379
See application file for complete search history.

(56) References Cited

U.S. PATENT DOCUMENTS

| | | | |
|---|---|---|---|
| 5,025,427 A | 6/1991 | Kuriyama | |
| 5,093,787 A | 3/1992 | Simmons | |
| 5,220,501 A | 6/1993 | Lawlor et al. | |
| 5,276,628 A | 1/1994 | Schneiderhan | |
| 5,423,033 A | 6/1995 | Yuen | |
| 5,603,025 A | 2/1997 | Tabb et al. | |
| 5,615,109 A | 3/1997 | Eder | |
| 5,842,185 A | 11/1998 | Chancey et al. | |
| 5,903,881 A | 5/1999 | Schrader et al. | |
| 5,918,216 A | 6/1999 | Miksovsky et al. | |
| 5,956,700 A | 9/1999 | Landry | |
| 6,055,541 A | 4/2000 | Solecki et al. | |
| 6,128,603 A | 10/2000 | Dent et al. | |
| 6,167,378 A | 12/2000 | Webber, Jr. | |
| 6,289,322 B1 | 9/2001 | Kitchen et al. | |
| 6,532,450 B1 | 3/2003 | Brown et al. | |
| 6,578,015 B1 | 6/2003 | Haseltine et al. | |
| 6,910,021 B2 | 6/2005 | Brown et al. | |
| 7,171,384 B1 | 1/2007 | Fitzpatrick et al. | |
| 7,831,508 B1 * | 11/2010 | Rosko | 705/38 |
| 7,867,083 B2 * | 1/2011 | Wells et al. | 463/29 |
| 7,870,065 B2 * | 1/2011 | Gutierrez-Sheris | 705/39 |
| 2002/0010612 A1 | 1/2002 | Smith et al. | |

(Continued)

OTHER PUBLICATIONS

Dennen et al. "Hospital bill audit programs can make a difference." Jan. 1989, Risk Management, V36, N1, p. 34(5).*

(Continued)

*Primary Examiner* — Kelly Campen
(74) *Attorney, Agent, or Firm* — Gunnison, McKay & Hodgson, L.L.P.; Philip McKay

(57) ABSTRACT

A system for accounts payable management whereby vendor payment priority criteria are defined and data associated with one or more vendors and/or vendor invoices is obtained along with data indicating funds available to make vendor payments. The data: indicating vendor payment priority criteria, associated with one or more vendors and/or vendor invoices, and indicating funds available to make vendor payments is then analyzed and used to automatically generate a proposed vendor payment plan. The proposed vendor payment plan is then displayed to one or more users associated as part of a user interface display and the one or more users are provided the opportunity to edit and/or approve the proposed vendor payment plan. Once the proposed and/or edited vendor payment plan is approved, one or more payments are automatically made to one or more vendors in accordance with the approved vendor payment plan.

30 Claims, 2 Drawing Sheets

U.S. PATENT DOCUMENTS

| | | | |
|---|---|---|---|
| 2002/0052841 A1* | 5/2002 | Guthrie et al. | 705/40 |
| 2002/0069143 A1 | 6/2002 | Cepeda | |
| 2002/0069168 A1 | 6/2002 | Lee et al. | |
| 2002/0082985 A1 | 6/2002 | MacKay | |
| 2002/0111907 A1 | 8/2002 | Ling | |
| 2002/0120570 A1 | 8/2002 | Loy | |
| 2002/0174006 A1 | 11/2002 | Rugge et al. | |
| 2003/0009402 A1 | 1/2003 | Mullen et al. | |
| 2003/0040990 A1 | 2/2003 | Lee et al. | |
| 2003/0083989 A1 | 5/2003 | Dougall | |
| 2003/0097331 A1 | 5/2003 | Cohen | |
| 2003/0158844 A1 | 8/2003 | Kramer et al. | |
| 2004/0034596 A1 | 2/2004 | Light et al. | |
| 2004/0098338 A1 | 5/2004 | Uehara et al. | |
| 2004/0117277 A1 | 6/2004 | Tagupa et al. | |
| 2004/0236646 A1 | 11/2004 | Wu et al. | |

OTHER PUBLICATIONS

Wilson, Caroline "Getting an 'A' on an RFP" Mar. 2001, Community Banker V10N3 pp. 18-21.*

GRBAC et al., "Payables Manager", U.S. Appl. No. 10/769,277, filed Jan. 30, 2004.

Hoag et al., "Monthly Transactions View", U.S. Appl. No. 10/997,157, filed Nov. 24, 2004.

Bachu et al., "Online Bill Payment Management and Projected Account Balances", U.S. Appl. No. 11/262,305, filed Oct. 28, 2005.

Goldman et al., "Calendar Display of Financial Data", U.S. Appl. No. 11/496,010, filed Jul. 28, 2006.

Flora et al., "Context-driven Transaction Reports", U.S. Appl. No. 11/266,829, filed Nov. 3, 2005.

"BillPay Plus Tour", pp. 1-8 [online]. Retrieved from the Internet: <URL:http://www.lowermybills.com>. No author provided.

"CheckFree® Financial View™", Brochure, 2005, pp. 1-4, CheckFree Corporation. No author provided.

"E Trade Financial® Online Bank Demo", pp. 1-13 [online]. Retrieved from the Internet: <URL:https://bankus.etrade.com>. No author provided.

"Tracking and Paying Expenses," *QuickBooks Fundamentals*, Chapter 13, 1st Printing, Intuit Inc., Nov. 2003, pp. 167-190. No author provided.

* cited by examiner

METHOD AND SYSTEM FOR ACCOUNTS PAYABLE PRIORITIZATION AND MANAGEMENT

RELATED APPLICATIONS

This application is a continuation-in-part of U.S. patent application Ser. No. 10/769,277, filed Jan. 30, 2004 now abandoned, and entitled "PAYABLES MANAGER", and naming Arno Grbac, Tara Tarapata, and Jana Eggers as inventors, and which is incorporated herein by reference in its entirety.

BACKGROUND

For many businesses, and particularly small businesses, the payment of invoices from vendors and/or other suppliers of services and/or products is a time consuming and critical task.

Currently, in order to process and/or pay vendor invoices a business must typically first determine what funds are available to make the payment. This process often involves checking balances of multiple accounts, either via "hard-copy" statements from one or more financial institutions, that are often dated and therefore inaccurate, or by logging onto one or more accounts via on-line banking sites associated with one or more financial institutions. In either case, in order to determine what funds are available to make payments, either the business owner, an employee of the business, or a third party agent of the business, must expend considerable time determining what funds are available for paying invoices.

In addition, in order determine what funds are available to make the payment, a business must further determine all payments that are in process, but not yet completed. This typically involves first determining all payments that are authorized, and for which the process of making the payments has started, but the actual check issuance, funds transfers, etc., have not taken place. In addition, payments already made but that are in transit, for instance checks that are in the mail or fund transfers that have not been recorded yet, must also be identified, tracked, and then taken into account. Once again, either the business owner, an employee of the business, or a third party agent of the business, must expend considerable time making these determinations to establish what funds are available for paying invoices.

Once a business has invested the time and energy to determine what funds are available to make payments, the business must then review all invoices from vendors and/or other suppliers to determine an order of payment to the vendors and/or other suppliers. For many businesses, this is a critical analysis. This is because many businesses, and particularly small businesses, must closely monitor their cash flow and therefore must often make decisions as to the priority of payments to vendors and/or other suppliers. In many cases, these cash flow issues dictate that payments to vendors and/or other suppliers be made as late as possible. In addition, in cases of larger businesses where perhaps cash flow is not as big an issue, it is still often in the businesses' best interest to pay vendor invoices as late as possible in order to collect interest on the funds as long as possible.

Despite the potential importance of the prioritization of payments to vendors and/or other suppliers, many businesses, and particularly small businesses, currently fail to prioritize payments to vendors and/or other suppliers at all, or they prioritize payments to vendors and/or other suppliers in an inconsistent manner, and often based on no discernable or consistent payment prioritization criteria. In short, in many cases, these often critical decisions regarding prioritization of payments to vendors and/or other suppliers are currently often made on an ad-hoc and uninformed basis, often with little or no discernible methodology or consistency.

In addition, in cases where a business does take the time to perform a careful analysis of prioritization of payments to vendors and/or other suppliers, this process is extremely time consuming and resource intensive. This is because, currently, prioritization of payments to vendors and/or other suppliers typically involves generating accounts payable reports and then comparing the accounts payable reports with the funds that were determined to be available for paying invoices as described above. Then, using current systems and methods, the analysis to determine prioritization of payments to vendors and/or other suppliers often involves one or more business owners, and/or one or more employees of the business, and/or one or more third party agents of the business, manually generating multiple hypothetical vendor payment plans, each including multiple hypothetical vendor payments. In this process, whenever a hypothetical payment to a given vendor and/or other supplier is proposed, a "mini-reconciliation" must be performed whereby the funds determined to be available for paying invoices must be updated to reflect the proposed payment. Currently, these mini-reconciliations must be performed for each hypothetical, or actual, payment made. Consequently, this part of the process is also often a time consuming and resource intensive process.

To further complicate matters, and add to the inefficiency of current methods and systems, even after significant resources are used to create the hypothetical vendor payment plans, the hypothetical vendor payment plans must then typically be reviewed by a higher authority within the business, such as an owner or a supervisor. Consequently, even more time and resources are used, and, often, this supervisory review results significant delays and often in major revisions and/or new hypothetical vendor payment plans being generated that must then again be reviewed by the higher authority. In addition, this process typically must be repeated on a regular basis, such as bi-weekly or monthly.

Finally, once a business has invested the considerable time and energy to: determine what funds are available to make payments; review all invoices from vendors and/or other suppliers; and to determine an order of payment to the vendors and/or other suppliers; the business must then typically generate paper checks, and mail/pay the postage for the paper checks. The business then typically treats the payment as having been made, and the payment money gone, despite the fact that the payment amount may still be shown as being present in the businesses bank account balance until the payment check actually clears.

In addition, due, in large part, to the emergence of numerous electronic payment methods, in many cases, multiple possible payment methods are available to a given business such as, but not limited to: online payment systems; electronic funds transfer systems; traditional paper/printed checks; credit accounts; etc. Since many businesses use two or more of these possible payment methods each payment cycle, the task of accurately determining what funds are available to make payments is even more difficult than it was in the past when virtually all payments where made by traditional paper/printed checks.

As discussed above, current methods and systems for payment of invoices from vendors and/or other suppliers of services and/or products are extremely time intensive and do not provide businesses the information and/or capability to make prioritization of payment decisions in an informed, methodical, and/or consistent manner.

SUMMARY

In accordance with one embodiment, a system and method for accounts payable management includes a process for accounts payable management whereby one or more vendor payment priority criteria are defined by a user and data indicating the one or more vendor payment priority criteria is obtained by the process for accounts payable management. In one embodiment, data associated with one or more vendors and/or one or more vendor invoices is also obtained by the process for accounts payable management. In one embodiment, data indicating funds available to make vendor payments is also obtained from one or more sources. In one embodiment, the data indicating one or more vendor payment priority criteria, the data associated with one or more vendors and/or one or more vendor invoices, and the data indicating funds available to make vendor payments is analyzed by the process for accounts payable management. In one embodiment, as a result of the analysis of the data indicating one or more vendor payment priority criteria, the data associated with one or more vendors and/or one or more vendor invoices, and the data indicating funds available to make vendor payments, the process for accounts payable management automatically generates a proposed vendor payment plan that is based, at least in part, on the one or more vendor payment priority criteria and/or is as consistent as possible with the one or more vendor payment priority criteria. In one embodiment, the proposed vendor payment plan is then displayed to one or more users associated with the business as part of a user interface display. In one embodiment, the one or more users are provided the opportunity to edit and/or approve the proposed vendor payment plan. In one embodiment, once a specified user, or users, approves the proposed and/or edited vendor payment plan, one or more payments are automatically made to one or more vendors in accordance with the approved vendor payment plan.

In one embodiment, the one or more vendor payment priority criteria include, but are not limited to, one or more of the following payment priority criteria: the criterion that invoices with the earliest due dates be paid first with available funds; the criterion that as many invoices as possible be paid with available funds; the criterion that invoices having early and/or on-time payment discounts be paid first with available funds; the criterion that invoices having late payment penalties be paid first with available funds; the criterion that invoices having the largest amount are paid as late as possible, and/or last, with the available funds; the criterion that all invoices be paid as late as possible; the criterion that invoices having the highest interest rates on account balances be paid first with available funds; the criterion that invoices from specified critical vendors be paid first with available funds; the criterion that invoices for materials considered critical to the business be paid first with available funds; the criterion that invoices from specified long-time or loyal vendors be paid first with available funds; the criterion that invoices for amounts less than a specified percentage of available funds be paid first with the available funds; the criterion that invoices from vendors that the business owes the most money be paid first with the available funds; the criterion that invoices from vendors that are the most overdue be paid first with the available funds; and/or any other criteria desired by a user, such as the business owner, an employee of the business, and/or an agent associated with the business.

In one embodiment the data indicating one or more vendor payment priority criteria is obtained from the user, typically the business owner, an employee of the business, and/or an agent associated with the business. In one embodiment the data indicating one or more vendor payment priority criteria is obtained from the user through a user interface screen displayed on a display device associated with a computing system and a user interface device such as a mouse, a keyboard, a touch screen, voice recognition software, or any other device and/or system for converting one or more user actions into computing system based instructions as discussed herein, and/or as known in the art at the time of filing, and/or as developed after the time of filing.

In one embodiment, the user is presented one or more vendor payment priority criteria by the process for accounts payable management on a display device associated with a computing system and the user is then provided the capability to select one or more of the one or more vendor payment priority criteria through a user interface screen displayed on a display device associated with a computing system and a user interface device such as a mouse, a keyboard, a touch screen, voice recognition software, or any other device and/or system for converting one or more user actions into computing system based instructions as discussed herein, and/or as known in the art at the time of filing, and/or as developed after the time of filing. In one embodiment, the user is provided the opportunity to prioritize the selected one or more vendor payment priority criteria.

In one embodiment, once the data indicating one or more vendor payment priority criteria are defined and/or obtained, the data is stored in whole, or in part, in a database, maintained by, accessible by, owned by, or otherwise related to: the process for accounts payable management, and/or a provider of the process for accounts payable management; a computing system implemented data management system, and/or a provider of a computing system implemented data management system; or any other party, by any one of the numerous mechanisms known to those of skill in the art.

For instance, in one embodiment, once the data indicating one or more vendor payment priority criteria are defined and/or obtained, the data is stored, in whole, or in part, in a memory system, or in a cache memory, or in any main memory or mass memory, associated with a computing system. In one embodiment, the data, in whole, or in part, is stored in any computing system and/or server system, or other device, in another location, or on/in a computer readable medium, and/or any other computer program product, as defined herein. In one embodiment, the data, in whole, or in part, is stored in a database. In one embodiment, the data, in whole, or in part, is stored on a webpage, in a web-based system or on a public network such as the Internet.

In one embodiment, the data associated with one or more vendors and/or one or more vendor invoices includes, but is not limited to, any one or more of the following: data indicating the vendor associated with a given invoice; data indicating the materials associated with a given invoice; data indicating all materials supplied to the business by a given vendor; data indicating how long the business has used a given vendor; data indicating the due date of a given invoice and/or all invoices associated with a given vendor; data indicating the terms of the contract with a given vendor and/or associated with a given invoice including any early and/or on-time payment discounts; data indicating the terms of the contract with a given vendor and/or associated with a given invoice including any late payment penalties; data indicating the terms of the contract with a given vendor and/or associated with a given invoice including any interest rates on unpaid account balances; data indicating the total amount the business owes a given vendor for all outstanding invoices; data indicating the vendor's address and/or address for making payments to the vendor; data indicating an account associated with a given vendor where payment funds should be transferred; and/or any other vendor data desired by a user, such as the business owner, an employee of the business, and/or an agent associated with the business.

In one embodiment the data associated with one or more vendors and/or one or more vendor invoices is obtained from the user, typically the business owner, an employee of the business, and/or an agent associated with the business. In one embodiment the data associated with one or more vendors and/or one or more vendor invoices is obtained from the user through a user interface screen displayed on a display device associated with a computing system and a user interface device such as a mouse, a keyboard, a touch screen, voice recognition software, or any other device and/or system for converting one or more user actions into computing system based instructions as discussed herein, and/or as known in the art at the time of filing, and/or as developed after the time of filing.

In one embodiment, the data associated with one or more vendors and/or one or more vendor invoices is obtained from vendor invoices received in an electronic format and then copying the data associated with one or more vendors and/or one or more vendor invoices.

In one embodiment, the data associated with one or more vendors and/or one or more vendor invoices is obtained by scanning hard-copy invoices into an electronic format and then copying the scanned in data associated with one or more vendors and/or one or more vendor invoices.

In one embodiment, the data associated with one or more vendors and/or one or more vendor invoices is obtained by, and/or through, and/or from, a computing system implemented data management system that is a parent system for, implements, and/or is otherwise associated with, the process for accounts payable management. In one embodiment, the data associated with one or more vendors and/or one or more vendor invoices is obtained by, and/or through, and/or from, a computing system implemented accounting and/or small business management system that is a parent system for, implements, and/or is otherwise associated with, the process for accounts payable management.

In one embodiment, once the data associated with one or more vendors and/or one or more vendor invoices is obtained, the data is stored in whole, or in part, in a database, maintained by, accessible by, owned by, or otherwise related to: the process for accounts payable management, and/or a provider of the process for accounts payable management; a computing system implemented data management system, and/or a provider of a computing system implemented data management system; or any other party, by any one of the numerous mechanisms known to those of skill in the art.

For instance, in one embodiment, once the data associated with one or more vendors and/or one or more vendor invoices is obtained, the data is stored, in whole, or in part, in a memory system, or in a cache memory, or in any main memory or mass memory, associated with a computing system. In one embodiment, the data, in whole, or in part, is stored in any computing system and/or server system, or other device, in another location, or on/in a computer readable medium, and/or any other computer program product, as defined herein. In one embodiment, the data, in whole, or in part, is stored in a database. In one embodiment, the data, in whole, or in part, is stored on a webpage, in a web-based system or on a public network such as the Internet.

In one embodiment, the data indicating funds available to make vendor payments is obtained from one or more financial institutions directly. In one embodiment, the data indicating funds available to make vendor payments is obtained from one or more financial institutions by providing process for accounts payable management access to one or more of the business's accounts via one or more on-line banking systems.

In one embodiment, the data indicating funds available to make vendor payments is obtained using screen scraping technology, or a similar technology.

In one embodiment, the data indicating funds available to make vendor payments is obtained from, and/or through, and/or by, one or more computing system implemented data management systems that are a parent system for, implement, and/or are otherwise associated with the process for accounts payable management. In one embodiment, the data indicating funds available to make vendor payments is obtained by, and/or through, and/or from, a computing system implemented accounting and/or small business management system that is a parent system for, implements, and/or is otherwise associated with, the process for accounts payable management.

In one embodiment, the data indicating funds available to make vendor payments is obtained from any database, computing system, and/or a server system, or any web-site or other web-based system, and/or using a computer program product as discussed herein.

In one embodiment, the data indicating funds available to make vendor payments is obtained via an Internet connection.

In one embodiment, the data indicating funds available to make vendor payments is obtained through any network of computing systems and/or server systems that is comprised of multiple different computers, wireless devices, cellular telephones, digital telephones, two-way pagers, personal digital assistants, server computers, or any desired combination of these devices, that are interconnected using a network.

In one embodiment, the data indicating funds available to make vendor payments is obtained through e-mail or through text messaging.

In one embodiment, the data indicating funds available to make vendor payments is obtained using any method, apparatus, process or mechanism for obtaining data, and/or for transferring data, images, screen displays, and/or text from one or more devices, computing systems, server systems, databases, web site/web functions and/or any systems to one or more other devices, computing systems, server systems, databases, web site/web functions and/or any systems, whether known at the time of filing or as thereafter developed.

In one embodiment, once the data indicating one or more vendor payment priority criteria, the data associated with one or more vendors and/or one or more vendor invoices, and the data indicating funds available to make vendor payments, is obtained, the data indicating one or more vendor payment priority criteria and the data associated with one or more vendors and/or one or more vendor invoices and the data indicating funds available to make vendor payments is processed and/or analyzed to generate a proposed vendor payment plan that is as consistent as possible with the one or more vendor payment priority criteria.

In one embodiment, the proposed vendor payment plan is then displayed to one or more users, typically business owners, and/or one or more employees of the business, and/or one or more agents associated with the business.

In one embodiment, the proposed vendor payment plan is displayed to the one or more users as part of a user interface display screen displayed on one or more display devices associated with one or more computing systems.

In one embodiment, the displayed proposed vendor payment plan includes a listing of proposed payments with each payment listing including one or more of the following: a priority of the proposed payment, in one embodiment, the location of the proposed payment in the proposed payment listing indicates the priority, i.e., the first listing is the highest priority proposed payment; the amount of the proposed payment; the proposed payment due date; the account through which the proposed payment is to be made; the proposed payment method; the vendor name; the criteria used to establish the priority of the proposed payment; the approval status of the proposed payment, and/or an approval entry field; and/or any other proposed payment data desired.

In one embodiment, the displayed proposed vendor payment plan is part of a larger accounts payable management screen that includes other displays such as, but not limited to: an available funds display that shows all available funds from all sources; a separate vendor payment criteria display showing the one or more vendor payment priority criteria used to generate the displayed proposed vendor payment plan; a calendar display for the period covered by the proposed vendor payment plan, or any other period of time desired; an accounts receivable display showing expected income for the period covered by the proposed vendor payment plan, or any other period of time desired; and/or any other display desired by the user and/or the provider of the process for accounts payable management.

In one embodiment, the one or more users are provided the opportunity to edit and/or approve the proposed vendor payment plan through a user interface screen displayed on a display device associated with a computing system and a user interface device such as a mouse, a keyboard, a touch screen, voice recognition software, or any other device and/or system for converting one or more user actions into computing system based instructions as discussed herein, and/or as known in the art at the time of filing, and/or as developed after the time of filing.

In one embodiment, the one or more users are provided the opportunity to edit and/or approve the proposed vendor payment plan via an edit/approval entry field in the displayed proposed vendor payment plan. In one embodiment, the one or more users are provided the opportunity to approve the entire proposed vendor payment plan via a single edit/approval entry field.

In one embodiment, the one or more users are provided the opportunity to approve/edit individual proposed vendor payments via multiple edit/approval entry fields that are associated with individual proposed vendor payments. In one embodiment, one or more users are provided the opportunity to indicate they have reviewed the proposed vendor payment plan, but are not necessarily given approval status. In some embodiments, specified users must approve the proposed vendor payment plan before the proposed vendor payment plan can be implemented.

In one embodiment, once the specified one or more users approve the proposed and/or edited vendor payment plan, one or more payments are made to one or more vendors in accordance with the approved vendor payment plan.

In one embodiment, once the specified one or more users approve the proposed and/or edited vendor payment plan, one or more payments are made to one or more vendors in accordance with the approved vendor payment plan via paper checks generated using approved vendor payment plan data and the data indicating the vendor's address and/or address for payments to the vendor obtained as part of the data associated with one or more vendors and/or one or more vendor invoices.

In one embodiment, once the specified one or more users approve the proposed and/or edited vendor payment plan, one or more payments are made to one or more vendors in accordance with the approved vendor payment plan via electronic funds transfer using the data indicating an account associated with a given vendor where payment funds should be transferred obtained as part of the data associated with one or more vendors and/or one or more vendor invoices.

In one embodiment, once the specified one or more users approve the proposed and/or edited vendor payment plan, one or more payments are made to one or more vendors in accordance with the approved vendor payment plan via one or more automated clearing house networks using the data indicating an account associated with a given vendor where payment funds should be transferred obtained as part of the data associated with one or more vendors and/or one or more vendor invoices.

Using the process for accounts payable management as disclosed herein, a given business provides data indicating one or more vendor payment priority criteria only once, then prioritization of payments to vendors and/or other suppliers is performed automatically, methodically, and consistently, each payment period based on the data associated with one or more vendors and/or one or more vendor invoices and current data indicating funds available to make vendor payments. Consequently, using the process for accounts payable management as disclosed herein, vendor payments can be made as late as possible and/or in accordance with discernable and consistent payment prioritization criteria.

In addition, using the process for accounts payable management as disclosed herein, a proposed vendor payment plan can be presented to, edited by and/or approved by, multiple users simultaneously and the proposed vendor payment plan can be displayed with other pertinent information in a single display screen. In addition, using the process for accounts payable management as disclosed herein, once the proposed vendor payment plan is approved by specified users, payments to one or more vendors can be made automatically in accordance with the approved vendor payment plan. Consequently, using the process for accounts payable management as disclosed herein, vendor payment decisions are made in an informed methodical manner and with minimal time, energy, and resources being expended.

In addition, as discussed in more detail below, using the below embodiments, with little or no modification and/or user input, there is considerable flexibility, adaptability, and opportunity for customization to meet the specific needs of various users under numerous circumstances.

Figure 1:
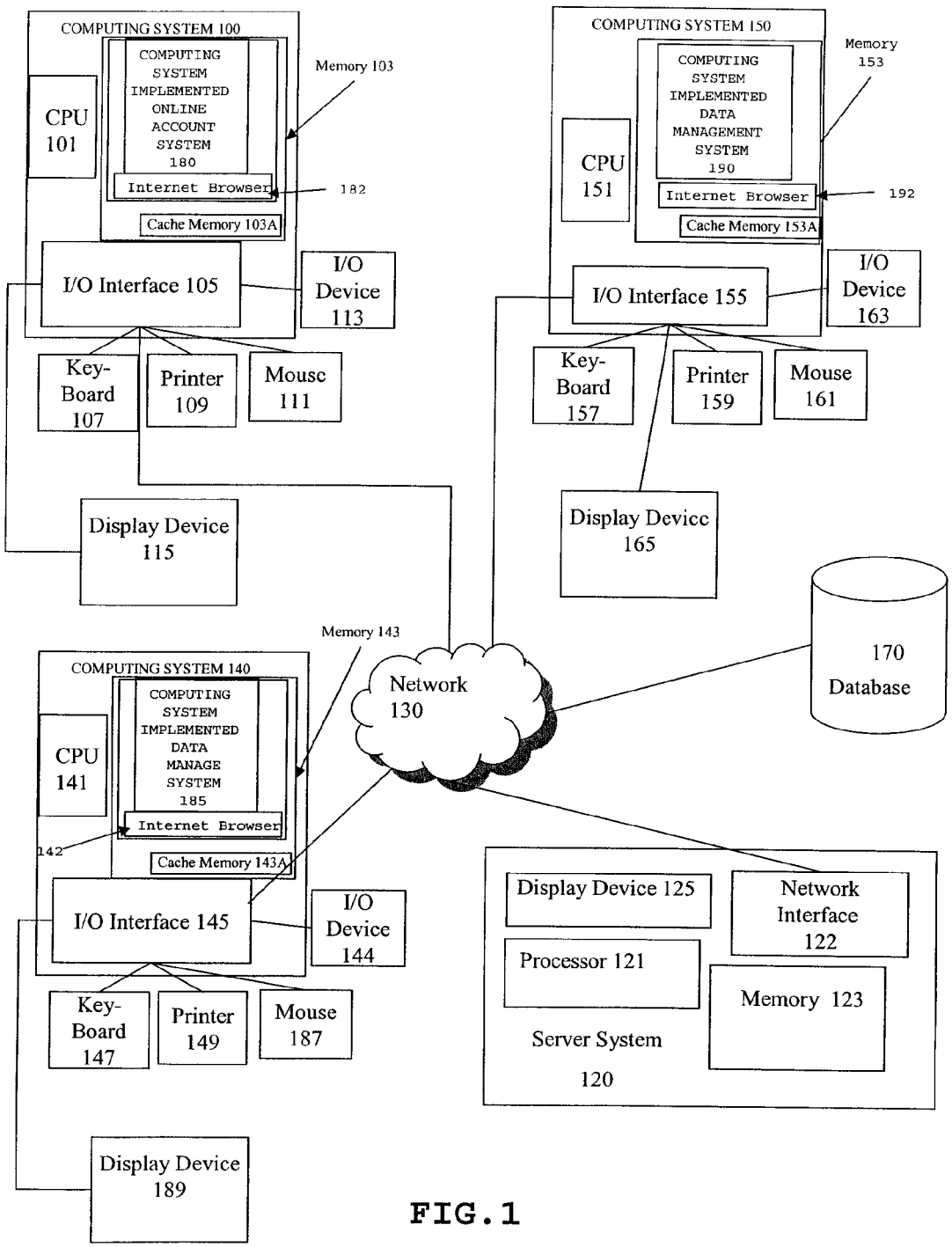
FIG. 1 is a block diagram of an exemplary hardware architecture for implementing one embodiment.

Common reference numerals are used throughout the FIGS. and the detailed description to indicate like elements. One skilled in the art will readily recognize that the above FIGS. are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIGS., which depict one or more exemplary embodiments. Embodiments may be embodied in many different forms and should not be construed as limited to the embodiments set forth herein, shown in the FIGS., and/or described below. Rather, these exemplary embodiments are provided to allow a complete disclosure that conveys the principles of the invention, as set forth in the claims, to those of skill in the art.

In accordance with one embodiment, a system and method for accounts payable management includes a process for accounts payable management whereby one or more vendor payment priority criteria are defined by a user and data indicating the one or more vendor payment priority criteria is obtained by the process for accounts payable management. In one embodiment, data associated with one or more vendors and/or one or more vendor invoices is also obtained by the process for accounts payable management. In one embodiment, data indicating funds available to make vendor payments is also obtained from one or more sources. In one embodiment, the data indicating one or more vendor payment priority criteria, the data associated with one or more vendors and/or one or more vendor invoices, and the data indicating funds available to make vendor payments is analyzed by the process for accounts payable management. In one embodiment, as a result of the analysis of the data indicating one or more vendor payment priority criteria, the data associated with one or more vendors and/or one or more vendor invoices, and the data indicating funds available to make vendor payments, the process for accounts payable management automatically generates a proposed vendor payment plan that is based, at least in part, on the one or more vendor payment priority criteria and/or is as consistent as possible with the one or more vendor payment priority criteria. In one embodiment, the proposed vendor payment plan is then displayed to one or more users associated with the business as part of a user interface display. In one embodiment, the one or more users are provided the opportunity to edit and/or approve the proposed vendor payment plan. In one embodiment, once a specified user, or users, approves the proposed and/or edited vendor payment plan, one or more payments are automatically made to one or more vendors in accordance with the approved vendor payment plan.

FIG. 1 is a block diagram of an exemplary hardware architecture for implementing one embodiment of a system and method for accounts payable management, such as exemplary process 200 (FIG. 2) discussed herein, that, returning to FIG. 1, includes: a computing system 100, e.g., a first computing system; a computing system 150, e.g., a second computing system; a computing system 140, e.g., a third computing system; a server system 120; and a database 170, all operatively coupled by a network 130.

As seen in FIG. 1, computing system 100 typically includes a central processing unit (CPU) 101, an input/output (I/O) interface 105, and a memory system 103, including cache memory 103A. In one embodiment, memory system 103 includes all, or part, of a computing system implemented online account management system 180, such as a computing system implemented online banking system as defined herein, known in the art at the time of filing, and/or as developed thereafter. In one embodiment, computing system implemented online account management system 180 is stored, in whole, or in part, in memory system 103, and is used by, or includes, or is accessed by, a process for accounts payable management (not shown in FIG. 1, see FIG. 2).

Returning to FIG. 1, computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. As discussed in more detail below, in one embodiment, a process for accounts payable management, and/or a computing system implemented online account management system, are entered, in whole, or in part, into computing system 100 via I/O device 113, such as from a CD, DVD, floppy disk, portable hard drive, memory stick, download site, or other medium and/or computer program product as defined herein.

In one embodiment, computing system 100 also includes an Internet browser capability 182 that, in one embodiment, includes a search engine (not shown) and is stored, in whole, or in part in memory 103.

In one embodiment, data associated with a financial institution, and/or a user business is stored, in whole, or in part, in memory system 103, and is used by, or is accessed by, a process for accounts payable management and/or one or more users. In one embodiment, computing system 100 is a computing system accessible by one or more users. In one embodiment, computing system 100 is used, and/or accessible, by another computing system, such as computing systems 150 and/or 140 (discussed below).

In one embodiment, computing system 100 is used, controlled, provided, and/or otherwise associated with, a financial institution and data representing all, or part, of data associated with a user businesses' available funds, is stored in computing system 100.

Computing system 100 can be any computing system as defined herein and/or as known in the art at the time of filing and/or as developed thereafter, that includes components that can execute all, or part, of a process for accounts payable management, and/or a computing system implemented online account management system, in accordance with at least one of the embodiments as described herein.

As also seen in FIG. 1, computing system 150 typically includes a central processing unit (CPU) 151, an input/output (I/O) interface 155, and a memory system 153, including cache memory 153A. In one embodiment, memory system 153 includes all, or part, of a computing system implemented data management system 190, such as any computing system implemented data management system defined herein, known in the art at the time of filing, and/or as developed thereafter. In one embodiment, computing system implemented data management system 190 is stored, in whole, or in part, in memory system 153, and is used by, or includes, or is accessed by, and/or is otherwise associated with a process for accounts payable management (not shown in FIG. 1, see FIG. 2).

Returning to FIG. 1, computing system 150 may further include standard user interface devices such as a keyboard 157, a mouse 161, a printer 159, and a display device 165, as well as, one or more standard input/output (I/O) devices 163, such as a compact disk (CD) or Digital Video Disc (DVD) drive, floppy disk drive, or other digital or waveform port, or other device capable of inputting data to, and outputting data from, computing system 150, whether available or known at the time of filing or as later developed. As discussed in more detail below, in one embodiment, a process for accounts payable management, and/or a computing system implemented data management system, are entered, in whole, or in part, into computing system 150 via I/O device 163, such as from a CD, DVD, floppy disk, portable hard drive, memory stick, download site, or other medium and/or computer program product as defined herein.

In one embodiment, computing system 150 also includes an Internet browser capability 192 that, in one embodiment, includes a search engine (not shown) and is stored, in whole, or in part in memory 153.

In one embodiment, data associated a user business and/or accounts payable by the user business is stored, in whole, or in part, in memory system 153, and is used by, or is accessed by, a process for accounts payable management and/or one or more users. In one embodiment, computing system 150 is a computing system accessible by one or more users. In one embodiment, computing system 150 is used, and/or accessible, by another computing system, such as computing systems 100 and/or 140 (discussed below).

Computing system 150 can be any computing system as defined herein and/or as known in the art at the time of filing and/or as developed thereafter, that includes components that can execute all, or part, of a process for accounts payable management, and/or a computing system implemented data management system, in accordance with at least one of the embodiments as described herein.

As also seen in FIG. 1, computing system 140 typically includes a central processing unit (CPU) 141, an input/output (I/O) interface 145, and a memory system 143, including cache memory 143A. In one embodiment, memory system 143 includes all, or part, of a computing system implemented data management system 185, such as any computing system implemented data management system defined herein, known in the art at the time of filing, and/or as developed thereafter. In one embodiment, computing system implemented data management system 185 is stored, in whole, or in part, in memory system 143, and is used by, or includes, or is accessed by, a process for accounts payable management (not shown in FIG. 1, see FIG. 2).

Returning to FIG. 1, computing system 140 may further include standard user interface devices such as a keyboard 147, a mouse 187, a printer 149, and a display device 189, as well as, one or more standard input/output (I/O) devices 144, such as a compact disk (CD) or Digital Video Disc (DVD) drive, floppy disk drive, or other digital or waveform port, or other device capable of inputting data to, and outputting data from, computing system 140, whether available or known at the time of filing or as later developed. As discussed in more detail below, in one embodiment, a process for accounts payable management, and/or a computing system implemented data management system, are entered, in whole, or in part, into computing system 140 via I/O device 144, such as from a CD, DVD, floppy disk, portable hard drive, memory stick, download site, or other medium and/or computer program product as defined herein.

In one embodiment, computing system 140 also includes an Internet browser capability 142 that, in one embodiment, includes a search engine (not shown) and is stored, in whole, or in part in memory 143.

In one embodiment, data associated with a process for accounts payable management and/or one or more user businesses, and/or one or more vendors associated with one or more user businesses is stored, in whole, or in part, in memory system 143. In one embodiment, computing system 140 is a computing system accessible by one or more users. In one embodiment, computing system 140 is used, and/or accessible, by another computing system, such as computing systems 150 and/or 100.

Computing system 140 can be any computing system as defined herein and/or as known in the art at the time of filing and/or as developed thereafter, that includes components that can execute all, or part, of a process for accounts payable management, and/or a computing system implemented data management system, in accordance with at least one of the embodiments as described herein.

Also shown in FIG. 1 is database 170. In one embodiment, database 170 is a data storage device, a designated server system or computing system, or a designated portion of one or more server systems or computing systems, such as computing systems 100, 140, 150 and server system 120, or a distributed database, or an external and/or portable hard drive. In one embodiment, database 170 is a dedicated mass storage device implemented in software, hardware, or a combination of hardware and software. In one embodiment, database 170 includes a web-based function. As discussed in more detail below, in one embodiment, database 170 is under the control of, or otherwise accessible by, a process for accounts payable management, and/or a computing system implemented online account management system and/or a computing system implemented data management system.

In one embodiment, data indicating one or more vendor payment priority criteria, and/or data associated with one or more vendors and/or one or more vendor invoices, and/or data indicating funds available to make vendor payments, and/or data associated with one or more user businesses, and/or accounts payable data associated with one or more user businesses, and/or accounts receivable data associated with one or more user businesses, is stored, in whole, or in part, in database 170, and is used by, or is accessed by, a process for accounts payable management. In one embodiment, database 170 is accessible by one or more users. In one embodiment, database 170 is used, and/or accessible, by a computing system, such as computing systems 100, 140, and/or 150, and/or a server system, such as sever system 120 (discussed below).

In one embodiment, computing systems 100, 140, and 150, and database 170, are coupled to a server system 120 through network 130. In one embodiment, server system 120 includes a server system display device 125, a server system processor 121, a server system memory 123, and a server system network interface 122.

In one embodiment, server system 120 is used in a station-to-station arrangement, such as a peer-to-peer, or hybrid peer-to peer, arrangement, as an indexing and/or central server used to connect a first computing system, such as computing system 100, and a second computing system, such as computing system 150.

In one embodiment, data indicating one or more vendor payment priority criteria, and/or data associated with one or more vendors and/or one or more vendor invoices, and/or data indicating funds available to make vendor payments, and/or data associated with one or more user businesses, and/or accounts payable data associated with one or more user businesses, and/or accounts receivable data associated with one or more user businesses, is stored, in whole, or in part, in server system 120, and is used by, or is accessed by, a process for accounts payable management. In one embodiment, server system 120 is accessible by one or more users. In one embodiment, server system 120 is used, and/or accessible, by a computing system, such as computing systems 100, 140, and/or 150, and/or one or more databases, such as database 170.

Network 130 can be any network or network system as defined herein, and/or known in the art at the time of filing, and/or as developed after the time of filing, capable of allowing communication between two or more computing systems, server systems, and/or databases.

Those of skill in the art will readily recognize that the components shown in FIG. 1, such as computing systems 100, 140, and 150, database 170, server system 120, and their respective components, are shown for illustrative purposes only and that architectures with more or fewer components can implement, and benefit from, one or more embodiments. Moreover, one or more components of computing system 100, computing system 140, computing system 150, database 170, and server system 120 may be located remotely from their respective system and accessed via network 130. In addition, the particular type of, and configuration of, computing systems 100, 140, and 150, database 170, and server system 120 are not relevant.

As discussed in more detail below, in one embodiment, a process for accounts payable management, and/or a computing system implemented online account management system, and/or a computing system implemented data management system, and/or data indicating one or more vendor payment priority criteria, and/or data associated with one or more vendors and/or one or more vendor invoices, and/or data indicating funds available to make vendor payments, and/or data associated with one or more user businesses, and/or accounts payable data associated with one or more user businesses, and/or accounts receivable data associated with one or more user businesses, is stored, in whole, or in part, in memory system 103 and/or cache memory 103A, of computing system 100, in memory system 143 and/or cache memory 143A, of computing system 140, and/or memory system 153 and/or cache memory 153A of computing system 150, and/or in server memory system 123 of server system 120 and/or in database 170, and executed on computing system 100, and/or computing system 140, and/or computing system 150. As used herein, a memory refers to a volatile memory, a non-volatile memory, or any combination of the two.

Although a process for accounts payable management, and/or a computing system implemented online account management system, and/or a computing system implemented data management system, are sometimes referred to herein, alternatively, as a process, an application, a module, a program, a component of a software system, a component of a software package, a component of a parent system, a plug-in, or a feature of a parent system, this terminology is illustrative only. In some embodiments, a process for accounts payable management, and/or a computing system implemented online account management system, and/or a computing system implemented data management system are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101, 141, and 150, or server system processor 121. In one embodiment, execution of a process by CPU 101, CPU 141, CPU 150, or server system processor 121, results in the operations of an agent computer process (not shown) and/or a rule computer process (not shown).

In one embodiment, a process for accounts payable management, and/or a computing system implemented online account management system, and/or a computing system implemented data management system, and/or data indicating one or more vendor payment priority criteria, and/or data associated with one or more vendors and/or one or more vendor invoices, and/or data indicating funds available to make vendor payments, and/or data associated with one or more user businesses, and/or accounts payable data associated with one or more user businesses, and/or accounts receivable data associated with one or more user businesses, are computer applications or processes and/or data implemented and/or run and/or stored, in full, or in part, in, or on, and/or through, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable and/or remote from the computing system.

Process

Herein, the terms "user" and "user business" include any person, party, business, system, application, organization, and/or entity interacting with, interfacing with, contacting, viewing, accepting data from, requesting data from, and/or otherwise associating with the process for accounts payable management for any purpose.

Herein the term "financial institution" includes any entity, party, person, application and/or system, such as, but not limited to, banks, credit card companies, asset account companies, and/or investment firms, that engages in money/asset/debt management and/or financial transaction management/recording and/or display.

Herein the term "vendor" includes any entity, party, person, application and/or system, that provides any service and/or product to a business.

Herein the term "vendor invoice" includes any device or mechanism for requesting payment delivered through any system, mechanism, process, or procedure, as discussed herein, and/or as known in the art at the time of filing, and/or as developed after the time of filing.

As used herein, the term "computing system", includes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As used herein, the term "computing system implemented data management system" includes, but is not limited to: computing system implemented accounting and/or invoicing systems, packages, programs, modules, or applications; computing system implemented financial management systems, packages, programs, modules, or applications; computing system implemented online account management systems, packages, programs, modules, or applications; computing system implemented banking systems, packages, programs, modules, or applications; computing system implemented personal and small business financial management systems, packages, programs, modules, or applications; computing system implemented business systems, packages, programs, modules, or applications; computing system implemented marketing device distribution systems, packages, programs, modules, or applications; computing system implemented financial institution financial management systems, packages, programs, modules, or applications; computing system implemented tax preparation systems, packages, programs, modules, or applications; computing system implemented business and/or point of sale systems, packages, programs, modules, or applications; computing system implemented healthcare management systems, packages, programs, modules, or applications and various other electronic data driven data management systems, packages, programs, modules, or applications, whether known at the time of filling or as developed later.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

As used herein, the term "database" includes, but is not limited to, any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as defined herein, known at the time of filing, or as developed thereafter.

In accordance with one embodiment, a system and method for accounts payable management includes a process for accounts payable management whereby one or more vendor payment priority criteria are defined by a user and data indicating the one or more vendor payment priority criteria is obtained by the process for accounts payable management. In one embodiment, data associated with one or more vendors and/or one or more vendor invoices is also obtained by the process for accounts payable management. In one embodiment, data indicating funds available to make vendor payments is also obtained from one or more sources. In one embodiment, the data indicating one or more vendor payment priority criteria, the data associated with one or more vendors and/or one or more vendor invoices, and the data indicating funds available to make vendor payments is analyzed by the process for accounts payable management. In one embodiment, as a result of the analysis of the data indicating one or more vendor payment priority criteria, the data associated with one or more vendors and/or one or more vendor invoices, and the data indicating funds available to make vendor payments, the process for accounts payable management automatically generates a proposed vendor payment plan that is based, at least in part, on the one or more vendor payment priority criteria and/or is as consistent as possible with the one or more vendor payment priority criteria. In one embodiment, the proposed vendor payment plan is then displayed to one or more users associated with the business as part of a user interface display. In one embodiment, the one or more users are provided the opportunity to edit and/or approve the proposed vendor payment plan. In one embodiment, once a specified user, or users, approves the proposed and/or edited vendor payment plan, one or more payments are automatically made to one or more vendors in accordance with the approved vendor payment plan.

Figure 2:
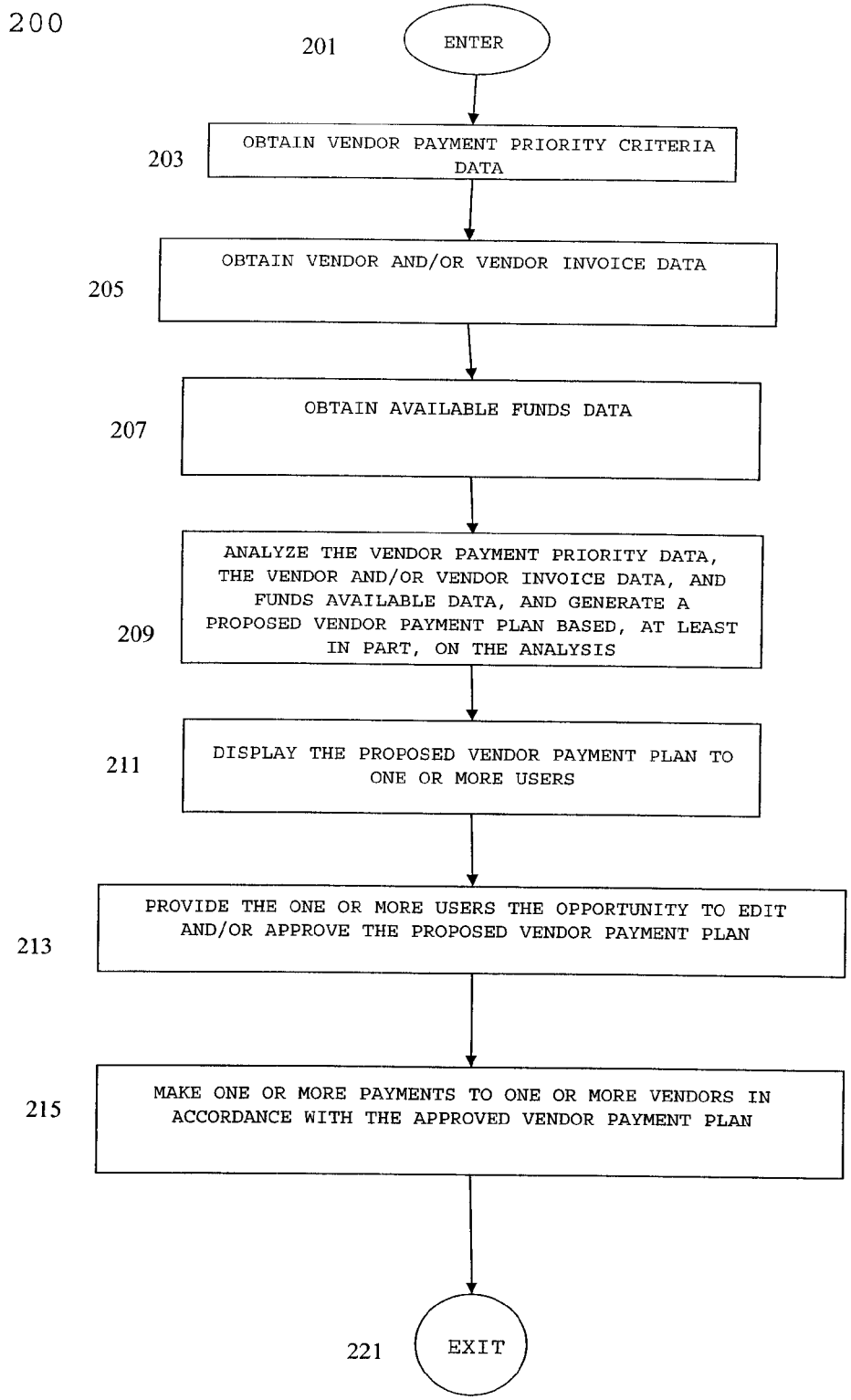
FIG. 2 is a flow chart depicting a process for accounts payable management in accordance with one embodiment.

FIG. 2 is a flow chart depicting a process for accounts payable management 200 in accordance with one embodiment. Process for accounts payable management 200 begins at ENTER OPERATION 201 and process flow proceeds to OBTAIN VENDOR PAYMENT PRIORITY CRITERIA DATA OPERATION 203.

In one embodiment, at OBTAIN VENDOR PAYMENT PRIORITY CRITERIA DATA OPERATION 203 one or more vendor payment priority criteria are defined and/or selected by a user and data indicating the one or more vendor payment priority criteria is obtained by process for accounts payable management 200.

In one embodiment, the one or more vendor payment priority criteria are defined/selected at OBTAIN VENDOR PAYMENT PRIORITY CRITERIA DATA OPERATION 203 by a user that is a representative of a given business that is implementing process for accounts payable management 200. In various embodiments, the user is any one or more of, but is not limited to, the following: an owner of the given business; a manger and/or supervisor for the given business; an accountant for the given business; an accounts payable manager for the given business; a legal representative of the given business; an agent for the given business; a third party accounts payable manager for the given business; a third party accountant for the given business; a third party book-keeper for the given business; a third party funds manager for the given business; a representative of a financial institution associated with the given business; a trustee of the given business; a bankruptcy trustee associated with the given business; or any other party, organization, employee, representative, and/or agent associated with the given business and authorized to perform at least part of the accounts payable function for the given business.

In one embodiment, the one or more vendor payment priority criteria defined/selected by a user at OBTAIN VENDOR PAYMENT PRIORITY CRITERIA DATA OPERATION 203 includes the criterion that invoices with the earliest due dates be paid first with available funds. In one embodiment, this criterion is used to pay vendor invoices on a first due, first paid, basis so long as funds are available.

In one embodiment, the one or more vendor payment priority criteria defined/selected by a user at OBTAIN VENDOR PAYMENT PRIORITY CRITERIA DATA OPERATION 203 includes the criterion that as many invoices as possible be paid with available funds. In one embodiment, this criterion is used to pay as many invoices as possible with available funds. In many cases, this will equate to paying invoices for the smallest amounts first from the available funds.

In one embodiment, the one or more vendor payment priority criteria defined/selected by a user at OBTAIN VENDOR PAYMENT PRIORITY CRITERIA DATA OPERATION 203 includes the criterion that invoices having early and/or on-time payment discounts be paid first with available funds. In one embodiment, this criterion is used to take advantage of any discounts offered by vendors for either early or on-time payment of invoices. As discussed below, in one embodiment, the existence of any discounts offered by vendors for either early or on-time payment of invoices is established at OBTAIN VENDOR AND/OR VENDOR INVOICE DATA OPERATION 205.

In one embodiment, the one or more vendor payment priority criteria defined/selected by a user at OBTAIN VENDOR PAYMENT PRIORITY CRITERIA DATA OPERATION 203 includes the criterion that invoices having late payment penalties be paid first with available funds. In one embodiment, this criterion is used to avoid incurring any late payment penalties for vendor invoices. As discussed below, in one embodiment, the existence of any penalties for late payment of invoices is established at OBTAIN VENDOR AND/OR VENDOR INVOICE DATA OPERATION 205.

In one embodiment, the one or more vendor payment priority criteria defined/selected by a user at OBTAIN VENDOR PAYMENT PRIORITY CRITERIA DATA OPERATION 203 includes the criterion that invoices having the largest amount are paid as late as possible, and/or last, with the available funds. In one embodiment, this criterion is used to keep the most funds possible in accounts associated with the business as long as possible in order to, for example, maximize interest collected on the funds, or for any other reason.

In one embodiment, the one or more vendor payment priority criteria defined/selected by a user at OBTAIN VENDOR PAYMENT PRIORITY CRITERIA DATA OPERATION 203 includes the criterion that all invoices be paid as late as possible. In one embodiment, this criterion is used to keep the most funds possible in accounts associated with the business as long as possible in order to, for example, maximize interest collected on the funds, or for any other reason.

In one embodiment, the one or more vendor payment priority criteria defined/selected by a user at OBTAIN VENDOR PAYMENT PRIORITY CRITERIA DATA OPERATION 203 includes the criterion that invoices having the highest interest rates on account balances be paid first with available funds. In one embodiment, this criterion is used to minimize interest paid by the business. In some cases, this criterion can be used to determine what credit card accounts to pay off first as well. As discussed below, in one embodiment, the existence and amount of interest associated with invoices and/or credit accounts is established at OBTAIN VENDOR AND/OR VENDOR INVOICE DATA OPERATION 205.

In one embodiment, the one or more vendor payment priority criteria defined/selected by a user at OBTAIN VENDOR PAYMENT PRIORITY CRITERIA DATA OPERATION 203 includes the criterion that invoices from specified critical vendors be paid first with available funds. In one embodiment, this criterion is used to ensure vendors that supply goods and/or services that are required by the business to conduct business, and/or are otherwise critical to the business, are paid first from available funds. As an example, in one embodiment, vendors supplying raw materials required to make a product offered by the given business would be identified and specified to be paid first with available funds.

In one embodiment, the one or more vendor payment priority criteria defined/selected by a user at OBTAIN VENDOR PAYMENT PRIORITY CRITERIA DATA OPERATION 203 includes the criterion that invoices for materials considered critical to the business be paid first with available funds. In one embodiment, this criterion is used to ensure payment for goods and/or services that are required by the business to conduct business, and/or are otherwise critical to the business, are made first from available funds. As an example, in one embodiment, raw materials required to make a product offered by the given business would be identified and invoices associated with those materials would be specified to be paid first with available funds.

In one embodiment, the one or more vendor payment priority criteria defined/selected by a user at OBTAIN VENDOR PAYMENT PRIORITY CRITERIA DATA OPERATION 203 includes the criterion that invoices from specified long-time, loyal, or otherwise preferred, vendors be paid first with available funds.

In one embodiment, the one or more vendor payment priority criteria defined/selected by a user at OBTAIN VENDOR PAYMENT PRIORITY CRITERIA DATA OPERATION 203 includes the criterion that invoices for amounts less than a specified percentage of available funds be paid first with the available funds. In one embodiment, this criterion is used to ensure that no one, or any small number, of invoices use up all of the available funds.

In one embodiment, the one or more vendor payment priority criteria defined/selected by a user at OBTAIN VENDOR PAYMENT PRIORITY CRITERIA DATA OPERATION 203 includes the criterion that invoices from vendors that the business owes the most money be paid first with the available funds. In one embodiment, this criterion is used to avoid running up unpaid balances with any given vendor without making at least partial payment to keep the vendor from cutting off products and/or services or perhaps taking collection actions.

In one embodiment, the one or more vendor payment priority criteria defined/selected by a user at OBTAIN VENDOR PAYMENT PRIORITY CRITERIA DATA OPERATION 203 includes the criterion that invoices from vendors that are the most overdue be paid first with the available funds. In one embodiment, this criterion is used to keep the vendor from cutting off products and/or services or perhaps taking action to collect.

In other embodiments, the one or more vendor payment priority criteria defined/selected by a user at OBTAIN VENDOR PAYMENT PRIORITY CRITERIA DATA OPERATION 203 include any combination of any of the above criteria and/or any other criteria desired by a user.

In one embodiment, the one or more vendor payment priority criteria are defined/selected at OBTAIN VENDOR PAYMENT PRIORITY CRITERIA DATA OPERATION 203 by a user that is a representative of a given business that is implementing process for accounts payable management 200 through a user interface screen displayed on a display device, such as display devices 115, 165, and/or 189 of FIG. 1, associated with a computing system, such as computing systems 100, 140 and/or 150, and a user interface device such as a mouse (111, 161, 187 In FIG. 1), and/or a keyboard (107, 147, 157 in FIG. 1), a touch screen, voice recognition software, or any other device and/or system for converting one or more user actions into computing system based instructions as discussed herein, and/or as known in the art at the time of filing, and/or as developed after the time of filing.

Returning to FIG. 2, in one embodiment, at OBTAIN VENDOR PAYMENT PRIORITY CRITERIA DATA OPERATION 203 one or more possible vendor payment priority criteria options are presented to the user by process for accounts payable management 200 on a display device, such as display devices 115, 165, and/or 189 of FIG. 1, associated with a computing system, such as computing systems 100, 140 and/or 150. In these embodiments, the user is then provided the capability to select one or more of the presented one or more vendor payment priority criteria through a user interface screen displayed on a display device, such as display devices 115, 165, and/or 189 of FIG. 1, associated with a computing system, such as computing systems 100, 140 and/or 150, and a user interface device such as a mouse (111, 161, 187 In FIG. 1), and/or a keyboard (107, 147, 157 in FIG. 1), a touch screen, voice recognition software, or any other device and/or system for converting one or more user actions into computing system based instructions as discussed herein, and/or as known in the art at the time of filing, and/or as developed after the time of filing.

Returning to FIG. 2, in one embodiment, once the one or more vendor payment priority criteria are defined/selected by a user at OBTAIN VENDOR PAYMENT PRIORITY CRITERIA DATA OPERATION 203, data indicating one or more vendor payment priority criteria is obtained by process for accounts payable management 200.

In one embodiment, at OBTAIN VENDOR PAYMENT PRIORITY CRITERIA DATA OPERATION 203 the data indicating the one or more vendor payment priority criteria is obtained by process for accounts payable management 200 either directly, or through a computing system implemented data management system, such as computing system implemented data management systems 190 and 185 of FIG. 1, that implements, includes, is accessible by, and/or is otherwise associated with, process for accounts payable management 200 (FIG. 2), and/or the user.

In one embodiment, at OBTAIN VENDOR PAYMENT PRIORITY CRITERIA DATA OPERATION 203 the data indicating the one or more vendor payment priority criteria is obtained by process for accounts payable management 200 by accessing one or more databases, such as database 170 of FIG. 1, one or more computing systems, such as computing systems 100 and/or 150 of FIG. 1, and/or one or more server systems, such as server system 120 of FIG. 1, or a web-site or other web-based system, and/or using a computer program product as defined herein.

Returning to FIG. 2, in one embodiment, at OBTAIN VENDOR PAYMENT PRIORITY CRITERIA DATA OPERATION 203 the data indicating the one or more vendor payment priority criteria is obtained by process for accounts payable management 200 through a network of computing systems and/or server systems that is comprised of multiple different computers, wireless devices, cellular telephones, digital telephones, two-way pagers, personal digital assistants, server computers, or any desired combination of these devices, that are interconnected using a network, such as network 130 of FIG. 1.

Returning to FIG. 2, in one embodiment, at OBTAIN VENDOR PAYMENT PRIORITY CRITERIA DATA OPERATION 203 the data indicating the one or more vendor payment priority criteria is obtained by process for accounts payable management 200 using any method, apparatus, process or mechanism for accessing data, images, screen displays, and/or text from one or more devices, computing systems, server systems, databases, web site/web functions and/or any systems and/or data, as discussed herein, and/or known in the art at the time of filing, and/or as developed after the time of filing.

In one embodiment, at OBTAIN VENDOR PAYMENT PRIORITY CRITERIA DATA OPERATION 203, once the data indicating the one or more vendor payment priority criteria is obtained by process for accounts payable management 200, the data is stored in whole, or in part, in a database, such as databases 170, 171, or 172 of FIG. 1 maintained by, accessible by, owned by, or otherwise related to: process for accounts payable management 200, and/or a provider of process for accounts payable management 200; a computing system implemented data management system, and/or a provider of a computing system implemented data management system; or any other party, by any one of the numerous mechanisms known to those of skill in the art.

For instance, in one embodiment, at OBTAIN VENDOR PAYMENT PRIORITY CRITERIA DATA OPERATION 203 the data indicating the one or more vendor payment priority criteria is stored, in whole, or in part, in a memory system, such as memory systems 103 and 153 or server memory system 123, or databases 170, 171, and/or 172, of FIG. 1, or in a cache memory, such as cache memories 103A/153A of FIG. 1, or in any main memory or mass memory, associated with a computing system, such as computing systems 100 or 150 described above. In one embodiment, the data indicating the one or more vendor payment priority criteria, is stored, in whole, or in part, in any computing system and/or server system, such as computing systems 100 or 150 or server system 120, or other device, in another location, or on/in a computer readable medium, and/or any other computer program product, as defined herein. In one embodiment, the data indicating the one or more vendor payment priority criteria is stored, in whole, or in part, in any database, such as one or more of databases 170, 171 and/or 172 of FIG. 1. In one embodiment, the data indicating the one or more vendor payment priority criteria is stored, in whole, or in part, on a webpage, in a web-based system or on a public network such as the Internet.

In one embodiment, once one or more vendor payment priority criteria are defined and/or selected by a user and data indicating the one or more vendor payment priority criteria is obtained by process for accounts payable management 200 at OBTAIN VENDOR PAYMENT PRIORITY CRITERIA DATA OPERATION 203, process flow proceeds to OBTAIN VENDOR AND/OR VENDOR INVOICE DATA OPERATION 205.

In one embodiment, at OBTAIN VENDOR AND/OR VENDOR INVOICE DATA OPERATION 205 data associated with one or more vendors and/or one or more vendor invoices is obtained by process for accounts payable management 200.

In one embodiment, at OBTAIN VENDOR AND/OR VENDOR INVOICE DATA OPERATION 205 the data associated with one or more vendors and/or one or more vendor invoices obtained by process for accounts payable management 200 includes, but is not limited to, data indicating the vendor associated with a given invoice.

In one embodiment, at OBTAIN VENDOR AND/OR VENDOR INVOICE DATA OPERATION 205 the data associated with one or more vendors and/or one or more vendor invoices obtained by process for accounts payable management 200 includes, but is not limited to, data indicating the materials associated with a given invoice.

In one embodiment, this data allows process for accounts payable management 200 to identify invoices for products and/or services required for the business's operation, and/or otherwise critical to the business.

In one embodiment, at OBTAIN VENDOR AND/OR VENDOR INVOICE DATA OPERATION 205 the data associated with one or more vendors and/or one or more vendor invoices obtained by process for accounts payable management 200 includes, but is not limited to, data indicating all materials supplied to the business by a given vendor. In one embodiment, this data allows process for accounts payable management 200 to identify vendors of products and/or services required for the business's operation, and/or otherwise critical to the business, even in cases where a given current invoice is not associated with critical products and/or services.

In one embodiment, at OBTAIN VENDOR AND/OR VENDOR INVOICE DATA OPERATION 205 the data associated with one or more vendors and/or one or more vendor invoices obtained by process for accounts payable management 200 includes, but is not limited to, data indicating how long the business has used a given vendor.

In one embodiment, this data allows process for accounts payable management 200 to identify vendors having long-term relationships with the business.

In one embodiment, at OBTAIN VENDOR AND/OR VENDOR INVOICE DATA OPERATION 205 the data associated with one or more vendors and/or one or more vendor invoices obtained by process for accounts payable management 200 includes, but is not limited to, data indicating the due date of a given invoice and/or all invoices associated with a given vendor. In one embodiment, this data allows process for accounts payable management 200 to pay invoices with the earliest due dates first, and/or to make payments as late as possible, if that is a vendor payment criterion selected/defined at OBTAIN VENDOR PAYMENT PRIORITY CRITERIA DATA OPERATION 203.

In one embodiment, at OBTAIN VENDOR AND/OR VENDOR INVOICE DATA OPERATION 205 the data associated with one or more vendors and/or one or more vendor invoices obtained by process for accounts payable management 200 includes, but is not limited to, data indicating the terms of the contract with a given vendor and/or associated with a given invoice including any early and/or on-time payment discounts. In one embodiment, this data allows process for accounts payable management 200 to pay invoices with early/on-time payment discounts first, if that is a vendor payment criterion selected/defined at OBTAIN VENDOR PAYMENT PRIORITY CRITERIA DATA OPERATION 203.

In one embodiment, at OBTAIN VENDOR AND/OR VENDOR INVOICE DATA OPERATION 205 the data associated with one or more vendors and/or one or more vendor invoices obtained by process for accounts payable management 200 includes, but is not limited to, data indicating the terms of the contract with a given vendor and/or associated with a given invoice including any late payment penalties. In one embodiment, this data allows process for accounts payable management 200 to pay invoices with late payment penalties first, if that is a vendor payment criterion selected/defined at OBTAIN VENDOR PAYMENT PRIORITY CRITERIA DATA OPERATION 203.

In one embodiment, at OBTAIN VENDOR AND/OR VENDOR INVOICE DATA OPERATION 205 the data associated with one or more vendors and/or one or more vendor invoices obtained by process for accounts payable management 200 includes, but is not limited to, data indicating the terms of the contract with a given vendor and/or associated with a given invoice including any interest rates on unpaid account balances. In one embodiment, this data allows process for accounts payable management 200 to pay invoices with the highest interest rates first, if that is a vendor payment criterion selected/defined at OBTAIN VENDOR PAYMENT PRIORITY CRITERIA DATA OPERATION 203.

In one embodiment, at OBTAIN VENDOR AND/OR VENDOR INVOICE DATA OPERATION 205 the data associated with one or more vendors and/or one or more vendor invoices obtained by process for accounts payable management 200 includes, but is not limited to, data indicating the total amount the business owes a given vendor for all outstanding invoices. In one embodiment, this data allows process for accounts payable management 200 to pay invoices with vendors that are owed the most money first, if that is a vendor payment criterion selected/defined at OBTAIN VENDOR PAYMENT PRIORITY CRITERIA DATA OPERATION 203.

In one embodiment, at OBTAIN VENDOR AND/OR VENDOR INVOICE DATA OPERATION 205 the data associated with one or more vendors and/or one or more vendor invoices obtained by process for accounts payable management 200 includes, but is not limited to, data indicating the vendor's address and/or address for making payments to the vendor. As discussed below, in one embodiment, this data is used by process for accounts payable management 200 to automatically generate checks and/or make payments at MAKE ONE OR MORE PAYMENTS TO ONE OR MORE VENDORS IN ACCORDANCE WITH THE APPROVED VENDOR PAYMENT PLAN OPERATION 215.

In one embodiment, at OBTAIN VENDOR AND/OR VENDOR INVOICE DATA OPERATION 205 the data associated with one or more vendors and/or one or more vendor invoices obtained by process for accounts payable management 200 includes, but is not limited to, data indicating an account associated with a given vendor where payment funds should be transferred. As discussed below, in one embodiment, this data is used by process for accounts payable management 200 to automatically make electronic payments/funds transfers at MAKE ONE OR MORE PAYMENTS TO ONE OR MORE VENDORS IN ACCORDANCE WITH THE APPROVED VENDOR PAYMENT PLAN OPERATION 215.

In one embodiment, at OBTAIN VENDOR AND/OR VENDOR INVOICE DATA OPERATION 205 the data associated with one or more vendors and/or one or more vendor invoices obtained by process for accounts payable management 200 includes any combination of any of the data discussed above and/or any other vendor data desired by a user and/or a provider of process for accounts payable management 200.

In one embodiment, at OBTAIN VENDOR AND/OR VENDOR INVOICE DATA OPERATION 205 the data associated with one or more vendors and/or one or more vendor invoices is obtained by process for accounts payable management 200 from a user through a user interface screen displayed on a display device, such as display devices 115, 165, and/or 189 of FIG. 1, associated with a computing system, such as computing systems 100, 140 and/or 150, and a user interface device such as a mouse (111, 161, 187 In FIG. 1), and/or a keyboard (107, 147, 157 in FIG. 1), a touch screen, voice recognition software, or any other device and/or system for converting one or more user actions into computing system based instructions as discussed herein, and/or as known in the art at the time of filing, and/or as developed after the time of filing.

Returning to FIG. 2, in one embodiment, at OBTAIN VENDOR AND/OR VENDOR INVOICE DATA OPERATION 205 the data associated with one or more vendors and/or one or more vendor invoices is obtained by process for accounts payable management 200 is obtained from vendor invoices received in an electronic format and then the data associated with one or more vendors and/or one or more vendor invoices is copied.

In one embodiment, at OBTAIN VENDOR AND/OR VENDOR INVOICE DATA OPERATION 205 the data associated with one or more vendors and/or one or more vendor invoices is obtained by process for accounts payable management 200 by scanning hard-copy invoices into an electronic format and then copying the scanned in data associated with one or more vendors and/or one or more vendor invoices.

In one embodiment, at OBTAIN VENDOR AND/OR VENDOR INVOICE DATA OPERATION 205 the data associated with one or more vendors and/or one or more vendor invoices is obtained by process for accounts payable management 200 using screen scraping technology and/or any similar technology as discussed herein, and/or as known in the art at the time of filing, and/or as developed after the time of filing.

In one embodiment, at OBTAIN VENDOR AND/OR VENDOR INVOICE DATA OPERATION 205 the data associated with one or more vendors and/or one or more vendor invoices is obtained by process for accounts payable management 200 through a computing system implemented data management system, such as computing system implemented data management systems 190 and 185 of FIG. 1, that implements, includes, is accessible by, and/or is otherwise associated with, process for accounts payable management 200 (FIG. 2), and/or the user.

Returning to FIG. 2, in one embodiment, at OBTAIN VENDOR AND/OR VENDOR INVOICE DATA OPERATION 205 the data associated with one or more vendors and/or one or more vendor invoices is obtained by process for accounts payable management 200 by accessing one or more databases, such as database 170 of FIG. 1, one or more computing systems, such as computing systems 100 and/or 150 of FIG. 1, and/or one or more server systems, such as server system 120 of FIG. 1, or a web-site or other web-based system, and/or using a computer program product as defined herein.

Returning to FIG. 2, in one embodiment, at OBTAIN VENDOR AND/OR VENDOR INVOICE DATA OPERATION 205 the data associated with one or more vendors and/or one or more vendor invoices is obtained by process for accounts payable management 200 through a network of computing systems and/or server systems that is comprised of multiple different computers, wireless devices, cellular telephones, digital telephones, two-way pagers, personal digital assistants, server computers, or any desired combination of these devices, that are interconnected using a network, such as network 130 of FIG. 1.

Returning to FIG. 2, in one embodiment, at OBTAIN VENDOR AND/OR VENDOR INVOICE DATA OPERATION 205 the data associated with one or more vendors and/or one or more vendor invoices is obtained by process for accounts payable management 200 using any method, apparatus, process or mechanism for accessing data, images, screen displays, and/or text from one or more devices, computing systems, server systems, databases, web site/web functions and/or any systems and/or data, as discussed herein, and/or known in the art at the time of filing, and/or as developed after the time of filing.

In one embodiment, at OBTAIN VENDOR AND/OR VENDOR INVOICE DATA OPERATION 205 once the data associated with one or more vendors and/or one or more vendor invoices is obtained by process for accounts payable management 200, the data is stored in whole, or in part, in a database, such as databases 170, 171, or 172 of FIG. 1 maintained by, accessible by, owned by, or otherwise related to: process for accounts payable management 200, and/or a provider of process for accounts payable management 200; a computing system implemented data management system, and/or a provider of a computing system implemented data management system; or any other party, by any one of the numerous mechanisms known to those of skill in the art.

For instance, in one embodiment, at OBTAIN VENDOR AND/OR VENDOR INVOICE DATA OPERATION 205 the data associated with one or more vendors and/or one or more vendor invoices is stored, in whole, or in part, in a memory system, such as memory systems 103 and 153 or server memory system 123, or databases 170, 171, and/or 172, of FIG. 1, or in a cache memory, such as cache memories 103A/ 153A of FIG. 1, or in any main memory or mass memory, associated with a computing system, such as computing systems 100 or 150 described above. In one embodiment, the data associated with one or more vendors and/or one or more vendor invoices, is stored, in whole, or in part, in any computing system and/or server system, such as computing systems 100 or 150 or server system 120, or other device, in another location, or on/in a computer readable medium, and/or any other computer program product, as defined herein. In one embodiment, the data associated with one or more vendors and/or one or more vendor invoices is stored, in whole, or in part, in any database, such as one or more of databases 170, 171 and/or 172 of FIG. 1. In one embodiment, the data associated with one or more vendors and/or one or more vendor invoices is stored, in whole, or in part, on a webpage, in a web-based system or on a public network such as the Internet.

In one embodiment, once data associated with one or more vendors and/or one or more vendor invoices is obtained by process for accounts payable management 200 at OBTAIN VENDOR AND/OR VENDOR INVOICE DATA OPERATION 205 process flow proceeds to OBTAIN AVAILABLE FUNDS DATA OPERATION 207.

In one embodiment, at OBTAIN AVAILABLE FUNDS DATA OPERATION 207 data indicating funds available to make vendor payments is obtained by process for accounts payable management 200 from one or more sources.

In one embodiment, at OBTAIN AVAILABLE FUNDS DATA OPERATION 207 the data indicating funds available to make vendor payments is obtained by process for accounts payable management 200 from a user through a user interface screen displayed on a display device, such as display devices 115, 165, and/or 189 of FIG. 1, associated with a computing system, such as computing systems 100, 140 and/or 150, and a user interface device such as a mouse (111, 161, 187 In FIG. 1), and/or a keyboard (107, 147, 157 in FIG. 1), a touch screen, voice recognition software, or any other device and/or system for converting one or more user actions into computing system based instructions as discussed herein, and/or as known in the art at the time of filing, and/or as developed after the time of filing.

In one embodiment, at OBTAIN AVAILABLE FUNDS DATA OPERATION 207 the data indicating funds available to make vendor payments is obtained by process for accounts payable management 200 through a computing system implemented data management system, such as computing system implemented data management systems 190 and 185 of FIG. 1, that implements, includes, is accessible by, and/or is otherwise associated with, process for accounts payable management 200 (FIG. 2), and/or the user. In one embodiment, the computing system implemented data management system is an accounting, accounts payable, and/or business data management system.

Many currently available computing system implemented data management systems help businesses manage their finances by providing a centralized interface with banks, credit card companies, and other various financial institutions, for obtaining account data and identifying and categorizing user financial transactions. Currently, computing system implemented data management systems typically obtain balance, projected balance, and transaction information, such as payee, payment amount, date, etc. via communication with banks, credit card providers, or other financial institutions, using electronic data transfer systems such as the Open Financial Exchange (OFX) specification, or various other systems for transferring financial transaction data.

As noted above, using computing system implemented data management systems, up-to-date balances for multiple accounts, including all accounts available to a given business to pay vendor invoices can be obtained and displayed to the user. Consequently, in one embodiment, at OBTAIN AVAILABLE FUNDS DATA OPERATION 207 the data indicating funds available to make vendor payments is obtained by process for accounts payable management 200 through a computing system implemented data management system that is a parent system for, implements, is accessible by, and/or is otherwise associated with, process for accounts payable management 200.

In one embodiment, at OBTAIN AVAILABLE FUNDS DATA OPERATION 207 the data indicating funds available to make vendor payments is obtained by process for accounts payable management 200 from one or more financial institutions directly via electronic data transfer.

In one embodiment, at OBTAIN AVAILABLE FUNDS DATA OPERATION 207 the data indicating funds available to make vendor payments is obtained by process for accounts payable management 200 from one or more financial institutions using screen scraping technology and/or any similar technology as discussed herein, and/or as known in the art at the time of filing, and/or as developed after the time of filing.

In one embodiment, at OBTAIN AVAILABLE FUNDS DATA OPERATION 207 the data indicating funds available to make vendor payments is obtained by process for accounts payable management 200 from one or more financial institutions by a user providing process for accounts payable management 200 access to one or more of the business's accounts via one or more on-line banking systems. In one embodiment, the user provides online banking system login data associated with the online banking systems including, but not limited to: the user's ID with the online banking system; the user's password used with the online banking system; the user's account number with the online banking system; and/or any other login data associated the online banking system. In one embodiment, this system login data is then used by process for accounts payable management 200 to automatically login to the one or more online banking systems and obtain account balance data for accounts associated with the business that are available to use to make vendor payments.

In one embodiment, at OBTAIN AVAILABLE FUNDS DATA OPERATION 207 the data indicating funds available to make vendor payments is obtained by process for accounts payable management 200 by accessing one or more databases, such as database 170 of FIG. 1, one or more computing systems, such as computing systems 100 and/or 150 of FIG. 1, and/or one or more server systems, such as server system 120 of FIG. 1, or a web-site or other web-based system, and/or using a computer program product as defined herein.

Returning to FIG. 2, in one embodiment, at OBTAIN AVAILABLE FUNDS DATA OPERATION 207 the data indicating funds available to make vendor payments is obtained by process for accounts payable management 200 through a network of computing systems and/or server systems that is comprised of multiple different computers, wireless devices, cellular telephones, digital telephones, two-way pagers, personal digital assistants, server computers, or any desired combination of these devices, that are interconnected using a network, such as network 130 of FIG. 1.

Returning to FIG. 2, in one embodiment, at OBTAIN AVAILABLE FUNDS DATA OPERATION 207 the data indicating funds available to make vendor payments is obtained by process for accounts payable management 200 using any method, apparatus, process or mechanism for accessing data, images, screen displays, and/or text from one or more devices, computing systems, server systems, databases, web site/web functions and/or any systems and/or data, as discussed herein, and/or known in the art at the time of filing, and/or as developed after the time of filing.

In one embodiment, at OBTAIN AVAILABLE FUNDS DATA OPERATION 207 the data indicating funds available to make vendor payments is updated and/or re-obtained by process for accounts payable management 200 on a periodic basis, and/or as the data indicating funds available to make vendor payments changes, and/or both.

In one embodiment, once data indicating funds available to make vendor payments is obtained by process for accounts payable management 200 from one or more sources at OBTAIN AVAILABLE FUNDS DATA OPERATION 207 process flow proceeds to ANALYZE THE VENDOR PAYMENT PRIORITY DATA, THE VENDOR AND/OR VENDOR INVOICE DATA, AND FUNDS AVAILABLE DATA, AND GENERATE A PROPOSED VENDOR PAYMENT PLAN BASED, AT LEAST IN PART, ON THE ANALYSIS OPERATION 209.

In one embodiment, at ANALYZE THE VENDOR PAYMENT PRIORITY DATA, THE VENDOR AND/OR VENDOR INVOICE DATA, AND FUNDS AVAILABLE DATA, AND GENERATE A PROPOSED VENDOR PAYMENT PLAN BASED, AT LEAST IN PART, ON THE ANALYSIS OPERATION 209 the data indicating one or more vendor payment priority criteria of OBTAIN VENDOR PAYMENT PRIORITY CRITERIA DATA OPERATION 203, the data associated with one or more vendors and/or one or more vendor invoices of OBTAIN VENDOR AND/OR VENDOR INVOICE DATA OPERATION 205, and the data indicating funds available to make vendor payments of OBTAIN AVAILABLE FUNDS DATA OPERATION 207 is analyzed by process for accounts payable management 200.

In one embodiment, at ANALYZE THE VENDOR PAYMENT PRIORITY DATA, THE VENDOR AND/OR VENDOR INVOICE DATA, AND FUNDS AVAILABLE DATA, AND GENERATE A PROPOSED VENDOR PAYMENT PLAN BASED, AT LEAST IN PART, ON THE ANALYSIS OPERATION 209 based on the analysis of the data indicating one or more vendor payment priority criteria of OBTAIN VENDOR PAYMENT PRIORITY CRITERIA DATA OPERATION 203, the data associated with one or more vendors and/or one or more vendor invoices of OBTAIN VENDOR AND/OR VENDOR INVOICE DATA OPERATION 205, and the data indicating funds available to make vendor payments of OBTAIN AVAILABLE FUNDS DATA OPERATION 207 process for accounts payable management 200 automatically generates a proposed vendor payment plan that is based, at least in part, on the one or more vendor payment priority criteria of OBTAIN VENDOR PAYMENT PRIORITY CRITERIA DATA OPERATION 203 and/or that is as consistent as possible with the one or more vendor payment priority criteria of OBTAIN VENDOR PAYMENT PRIORITY CRITERIA DATA OPERATION 203.

Numerous methods, means, processes, and procedures are known in the art, and used in the art, for processing data in light of one or more parameters/criteria. Consequently, a more detailed discussion of the specific methods, means, processes, and procedures for processing the data associated with one or more vendors and/or one or more vendor invoices of OBTAIN VENDOR AND/OR VENDOR INVOICE DATA OPERATION 205 in light of the one or more vendor payment priority criteria of OBTAIN VENDOR PAYMENT PRIORITY CRITERIA DATA OPERATION 203 and the data indicating funds available to make vendor payments of OBTAIN AVAILABLE FUNDS DATA OPERATION 207 at ANALYZE THE VENDOR PAYMENT PRIORITY DATA, THE VENDOR AND/OR VENDOR INVOICE DATA, AND FUNDS AVAILABLE DATA, AND GENERATE A PROPOSED VENDOR PAYMENT PLAN BASED, AT LEAST IN PART, ON THE ANALYSIS OPERATION 209 is omitted here to avoid detracting from the invention.

In one embodiment, once the data indicating one or more vendor payment priority criteria of OBTAIN VENDOR PAY- MENT PRIORITY CRITERIA DATA OPERATION 203, the data associated with one or more vendors and/or one or more vendor invoices of OBTAIN VENDOR AND/OR VENDOR INVOICE DATA OPERATION 205, and the data indicating funds available to make vendor payments of OBTAIN AVAILABLE FUNDS DATA OPERATION 207, is processed and/or analyzed by process for accounts payable management 200 to generate a proposed vendor payment plan that is as consistent as possible with the one or more vendor payment priority criteria of OBTAIN VENDOR PAYMENT PRIORITY CRITERIA DATA OPERATION 203 at ANALYZE THE VENDOR PAYMENT PRIORITY DATA, THE VENDOR AND/OR VENDOR INVOICE DATA, AND FUNDS AVAILABLE DATA, AND GENERATE A PROPOSED VENDOR PAYMENT PLAN BASED, AT LEAST IN PART, ON THE ANALYSIS OPERATION 209 process flow proceeds to DISPLAY THE PROPOSED VENDOR PAYMENT PLAN TO ONE OR MORE USERS OPERATION 211.

In one embodiment, at DISPLAY THE PROPOSED VENDOR PAYMENT PLAN TO ONE OR MORE USERS OPERATION 211 the proposed vendor payment plan of ANALYZE THE VENDOR PAYMENT PRIORITY DATA, THE VENDOR AND/OR VENDOR INVOICE DATA, AND FUNDS AVAILABLE DATA, AND GENERATE A PROPOSED VENDOR PAYMENT PLAN BASED, AT LEAST IN PART, ON THE ANALYSIS OPERATION 209 is displayed to one or more users associated with the business as part of a user interface display.

In one embodiment, at DISPLAY THE PROPOSED VENDOR PAYMENT PLAN TO ONE OR MORE USERS OPERATION 211 the proposed vendor payment plan of ANALYZE THE VENDOR PAYMENT PRIORITY DATA, THE VENDOR AND/OR VENDOR INVOICE DATA, AND FUNDS AVAILABLE DATA, AND GENERATE A PROPOSED VENDOR PAYMENT PLAN BASED, AT LEAST IN PART, ON THE ANALYSIS OPERATION 209 is displayed to the one or more users as part of a user interface display screen displayed on one or more display devices, such as display devices 115, 165, and/or 189 of FIG. 1, associated with one or more computing systems, such as computing systems 100, 140 and/or 150.

Returning to FIG. 2, in one embodiment, at DISPLAY THE PROPOSED VENDOR PAYMENT PLAN TO ONE OR MORE USERS OPERATION 211 the displayed proposed vendor payment plan includes a listing of proposed payments with each payment listing including one or more of the following: a priority of the proposed payment, in one embodiment, the location of the proposed payment in the proposed payment listing indicates the priority, i.e., the first listing is the highest priority proposed payment; the amount of the proposed payment; the proposed payment due date; the account through which the proposed payment is to be made; the proposed payment method; the vendor name; the criteria of OBTAIN VENDOR PAYMENT PRIORITY CRITERIA DATA OPERATION 203 used to establish the priority of the proposed payment; the approval status of the proposed payment, and/or an approval entry field; and/or any other proposed payment data desired.

In one embodiment, at DISPLAY THE PROPOSED VENDOR PAYMENT PLAN TO ONE OR MORE USERS OPERATION 211, the displayed proposed vendor payment plan is part of a larger accounts payable management screen that includes other displays such as, but not limited to: an available funds display that shows all available funds from all sources; a separate vendor payment criteria display showing the one or more vendor payment priority criteria used to generate the displayed proposed vendor payment plan; a calendar display for the period covered by the proposed vendor payment plan, or any other period of time desired; an accounts receivable display showing expected income for the period covered by the proposed vendor payment plan, or any other period of time desired; and/or any other display, or combination of displays desired by the user and/or the provider of process for accounts payable management 200.

In one embodiment, once the proposed vendor payment plan of ANALYZE THE VENDOR PAYMENT PRIORITY DATA, THE VENDOR AND/OR VENDOR INVOICE DATA, AND FUNDS AVAILABLE DATA, AND GENERATE A PROPOSED VENDOR PAYMENT PLAN BASED, AT LEAST IN PART, ON THE ANALYSIS OPERATION 209 is displayed to one or more users associated with the business as part of a user interface display at DISPLAY THE PROPOSED VENDOR PAYMENT PLAN TO ONE OR MORE USERS OPERATION 211, process flow proceeds to PROVIDE THE ONE OR MORE USERS THE OPPORTUNITY TO EDIT AND/OR APPROVE THE PROPOSED VENDOR PAYMENT PLAN OPERATION 213.

In one embodiment, at PROVIDE THE ONE OR MORE USERS THE OPPORTUNITY TO EDIT AND/OR APPROVE THE PROPOSED VENDOR PAYMENT PLAN OPERATION 213 one or more of the one or more users of DISPLAY THE PROPOSED VENDOR PAYMENT PLAN TO ONE OR MORE USERS OPERATION 211 are provided the opportunity to edit and/or approve the proposed vendor payment plan of DISPLAY THE PROPOSED VENDOR PAYMENT PLAN TO ONE OR MORE USERS OPERATION 211.

In one embodiment, at PROVIDE THE ONE OR MORE USERS THE OPPORTUNITY TO EDIT AND/OR APPROVE THE PROPOSED VENDOR PAYMENT PLAN OPERATION 213 one or more of the one or more users of DISPLAY THE PROPOSED VENDOR PAYMENT PLAN TO ONE OR MORE USERS OPERATION 211 are provided the opportunity to edit and/or approve the proposed vendor payment plan of DISPLAY THE PROPOSED VENDOR PAYMENT PLAN TO ONE OR MORE USERS OPERATION 211 through one or more user interface screens displayed on one or more display devices, such as display devices 115, 165, and/or 189 of FIG. 1, associated with a one or more computing systems, such as computing systems 100, 140 and/or 150, and one or more user interface devices such as a mouse (111, 161, 187 In FIG. 1), and/or a keyboard (107, 147, 157 in FIG. 1), a touch screen, voice recognition software, or any other devices and/or systems for converting one or more user actions into computing system based instructions as discussed herein, and/or as known in the art at the time of filing, and/or as developed after the time of filing.

In one embodiment, at PROVIDE THE ONE OR MORE USERS THE OPPORTUNITY TO EDIT AND/OR APPROVE THE PROPOSED VENDOR PAYMENT PLAN OPERATION 213 one or more of the one or more users of DISPLAY THE PROPOSED VENDOR PAYMENT PLAN TO ONE OR MORE USERS OPERATION 211 are provided the opportunity to edit and/or approve the proposed vendor payment plan of DISPLAY THE PROPOSED VENDOR PAYMENT PLAN TO ONE OR MORE USERS OPERATION 211 via an edit/approval entry field in the displayed proposed vendor payment plan.

In one embodiment, at PROVIDE THE ONE OR MORE USERS THE OPPORTUNITY TO EDIT AND/OR APPROVE THE PROPOSED VENDOR PAYMENT PLAN OPERATION 213 one or more of the one or more users of DISPLAY THE PROPOSED VENDOR PAYMENT PLAN TO ONE OR MORE USERS OPERATION 211 are provided the opportunity to approve the entire proposed vendor payment plan of DISPLAY THE PROPOSED VENDOR PAYMENT PLAN TO ONE OR MORE USERS OPERATION 211 via a single edit/approval entry field.

In one embodiment, at PROVIDE THE ONE OR MORE USERS THE OPPORTUNITY TO EDIT AND/OR APPROVE THE PROPOSED VENDOR PAYMENT PLAN OPERATION 213 one or more of the one or more users of DISPLAY THE PROPOSED VENDOR PAYMENT PLAN TO ONE OR MORE USERS OPERATION 211 are provided the opportunity to approve/edit individual proposed vendor payments of the proposed vendor payment plan of DISPLAY THE PROPOSED VENDOR PAYMENT PLAN TO ONE OR MORE USERS OPERATION 211 via multiple edit/approval entry fields that are associated with individual proposed vendor payments.

In one embodiment, one or more users are provided the opportunity to indicate they have reviewed the proposed vendor payment plan of DISPLAY THE PROPOSED VENDOR PAYMENT PLAN TO ONE OR MORE USERS OPERATION 211, but are not necessarily given approval status.

In some embodiments, one or more specified users must approve the proposed vendor payment plan of proposed vendor payment plan of DISPLAY THE PROPOSED VENDOR PAYMENT PLAN TO ONE OR MORE USERS OPERATION 211 before the proposed vendor payment plan of proposed vendor payment plan of DISPLAY THE PROPOSED VENDOR PAYMENT PLAN TO ONE OR MORE USERS OPERATION 211 can be implemented.

In one embodiment, once one or more of the one or more users of DISPLAY THE PROPOSED VENDOR PAYMENT PLAN TO ONE OR MORE USERS OPERATION 211 are provided the opportunity to edit and/or approve the proposed vendor payment plan of DISPLAY THE PROPOSED VENDOR PAYMENT PLAN TO ONE OR MORE USERS OPERATION 211 at PROVIDE THE ONE OR MORE USERS THE OPPORTUNITY TO EDIT AND/OR APPROVE THE PROPOSED VENDOR PAYMENT PLAN OPERATION 213, process flow proceeds to MAKE ONE OR MORE PAYMENTS TO ONE OR MORE VENDORS IN ACCORDANCE WITH THE APPROVED VENDOR PAYMENT PLAN OPERATION 215.

In one embodiment, at MAKE ONE OR MORE PAYMENTS TO ONE OR MORE VENDORS IN ACCORDANCE WITH THE APPROVED VENDOR PAYMENT PLAN OPERATION 215 once the specified users, if any, of PROVIDE THE ONE OR MORE USERS THE OPPORTUNITY TO EDIT AND/OR APPROVE THE PROPOSED VENDOR PAYMENT PLAN OPERATION 213 approve the proposed and/or edited vendor payment plan, one or more payments are automatically made to one or more vendors in accordance with the approved vendor payment plan of DISPLAY THE PROPOSED VENDOR PAYMENT PLAN TO ONE OR MORE USERS OPERATION 211 and PROVIDE THE ONE OR MORE USERS THE OPPORTUNITY TO EDIT AND/OR APPROVE THE PROPOSED VENDOR PAYMENT PLAN OPERATION 213.

In one embodiment, at MAKE ONE OR MORE PAYMENTS TO ONE OR MORE VENDORS IN ACCORDANCE WITH THE APPROVED VENDOR PAYMENT PLAN OPERATION 215 payments are automatically made to one or more vendors in accordance with the approved vendor payment plan of DISPLAY THE PROPOSED VENDOR PAYMENT PLAN TO ONE OR MORE USERS OPERATION 211 and PROVIDE THE ONE OR MORE USERS THE OPPORTUNITY TO EDIT AND/OR APPROVE THE PROPOSED VENDOR PAYMENT PLAN OPERATION 213 via paper checks generated using the data from the approved vendor payment plan of DISPLAY THE PROPOSED VENDOR PAYMENT PLAN TO ONE OR MORE USERS OPERATION 211 and PROVIDE THE ONE. OR MORE USERS THE OPPORTUNITY TO EDIT AND/OR APPROVE THE PROPOSED VENDOR PAYMENT PLAN OPERATION 213 and the data indicating the vendor's address and/or address for payments to the vendor obtained at OBTAIN VENDOR AND/OR VENDOR INVOICE DATA OPERATION 205 as part of the data associated with one or more vendors and/or one or more vendor invoices.

In one embodiment, at MAKE ONE OR MORE PAYMENTS TO ONE OR MORE VENDORS IN ACCORDANCE WITH THE APPROVED VENDOR PAYMENT PLAN OPERATION 215 payments are automatically made to one or more vendors in accordance with the approved vendor payment plan of DISPLAY THE PROPOSED VENDOR PAYMENT PLAN TO ONE OR MORE USERS OPERATION 211 and PROVIDE THE ONE OR MORE USERS THE OPPORTUNITY TO EDIT AND/OR APPROVE THE PROPOSED VENDOR PAYMENT PLAN OPERATION 213 via electronic funds transfer using the data from the approved vendor payment plan of DISPLAY THE PROPOSED VENDOR PAYMENT PLAN TO ONE OR MORE USERS OPERATION 211 and PROVIDE THE ONE OR MORE USERS THE OPPORTUNITY TO EDIT AND/ OR APPROVE THE PROPOSED VENDOR PAYMENT PLAN OPERATION 213 and the data indicating an account associated with a given vendor where payment funds should be transferred obtained at OBTAIN VENDOR AND/OR VENDOR INVOICE DATA OPERATION 205 as part of the data associated with one or more vendors and/or one or more vendor invoices.

In one embodiment, at MAKE ONE OR MORE PAYMENTS TO ONE OR MORE VENDORS IN ACCORDANCE WITH THE APPROVED VENDOR PAYMENT PLAN OPERATION 215 payments are automatically made to one or more vendors in accordance with the approved vendor payment plan of DISPLAY THE PROPOSED VENDOR PAYMENT PLAN TO ONE OR MORE USERS OPERATION 211 and PROVIDE THE ONE OR MORE USERS THE OPPORTUNITY TO EDIT AND/OR APPROVE THE PROPOSED VENDOR PAYMENT PLAN OPERATION 213 via one or more automated clearing house networks for electronic funds transfer using the data from the approved vendor payment plan of DISPLAY THE PROPOSED VENDOR PAYMENT PLAN TO ONE OR MORE USERS OPERATION 211 and PROVIDE THE ONE OR MORE USERS THE OPPORTUNITY TO EDIT AND/OR APPROVE THE PROPOSED VENDOR PAYMENT PLAN OPERATION 213 and the data indicating an account associated with a given vendor where payment funds should be transferred obtained at OBTAIN VENDOR AND/OR VENDOR INVOICE DATA OPERATION 205 as part of the data associated with one or more vendors and/or one or more vendor invoices.

In one embodiment, at MAKE ONE OR MORE PAYMENTS TO ONE OR MORE VENDORS IN ACCORDANCE WITH THE APPROVED VENDOR PAYMENT PLAN OPERATION 215 payments are automatically made to one or more vendors in accordance with the approved vendor payment plan of DISPLAY THE PROPOSED VENDOR PAYMENT PLAN TO ONE OR MORE USERS OPERATION 211 and PROVIDE THE ONE OR MORE USERS THE OPPORTUNITY TO EDIT AND/OR APPROVE THE PROPOSED VENDOR PAYMENT PLAN OPERATION 213 via an payment means, mechanism, and/or process, as discussed herein, and/or known in the art at the time of filing, and/or as developed after the time of filing.

In one embodiment, once one or more payments are automatically made to one or more vendors in accordance with the approved vendor payment plan of DISPLAY THE PROPOSED VENDOR PAYMENT PLAN TO ONE OR MORE USERS OPERATION 211 and PROVIDE THE ONE OR MORE USERS THE OPPORTUNITY TO EDIT AND/OR APPROVE THE PROPOSED VENDOR PAYMENT PLAN OPERATION 213 at MAKE ONE OR MORE PAYMENTS TO ONE OR MORE VENDORS IN ACCORDANCE WITH THE APPROVED VENDOR PAYMENT PLAN OPERATION 215, process flow proceeds to EXIT OPERATION 221.

In one embodiment, at EXIT OPERATION 221 process for accounts payable management 200 is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for accounts payable management 200, a given business provides data indicating one or more vendor payment priority criteria only once, then prioritization of payments to vendors and/or other suppliers is performed automatically, methodically, and consistently, each payment period based on the data associated with one or more vendors and/or one or more vendor invoices and current data indicating funds available to make vendor payments. Consequently, using process for accounts payable management 200, vendor payments can be made as late as possible and/or in accordance with discernable and consistent payment prioritization criteria.

In addition, using process for accounts payable management 200, a proposed vendor payment plan can be presented to, edited by and/or approved by, multiple users simultaneously and the proposed vendor payment plan can be displayed with other pertinent information in a single display screen. In addition, using process for accounts payable management 200, once the proposed vendor payment plan is approved by specified users, payments to one or more vendors can be made automatically in accordance with the approved vendor payment plan. Consequently, using process for accounts payable management 200, vendor payment decisions are made in an informed methodical manner and with minimal time, energy, and resources being expended.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein is merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining", "analyzing", "making", "storing", "providing", "accessing", "displaying", "transferring", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS. for method and apparatus and/or process or application for accounts payable management, discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for accounts payable management comprising:

using one or more processors associated with one or more computing systems to obtain data indicating a user's vendor payment priority criteria, the user being associated with a business;

using one or more processors associated with one or more computing systems to obtain data associated with one or more vendors to the business;

using one or more processors associated with one or more computing systems to obtain data associated with one or more invoices from one or more of the one or more vendors to the business;

using one or more processors associated with one or more computing systems to obtain data indicating funds available to the business to pay at least part of the one or more invoices from one or more of the one or more vendors to the business;

using one or more processors associated with one or more computing systems to analyze the data indicating the user's vendor payment priority criteria, the data associated with one or more vendors to the business, the data associated with one or more invoices from one or more of the one or more vendors to the business, and the data indicating funds available to the business to pay at least part of the one or more invoices from one or more of the one or more vendors to the business;

using one or more processors associated with one or more computing systems to generate a proposed vendor payment plan based on the analysis of the data indicating the user's vendor payment priority criteria, the data associated with one or more vendors to the business, the data associated with one or more invoices from one or more of the one or more vendors to the business, and the data indicating funds available to the business to pay at least part of the one or more invoices from one or more of the one or more vendors to the business, the proposed vendor payment plan including one or more proposed vendor payments prioritized to be as consistent as possible with the user's vendor payment priority criteria;

using one or more processors associated with one or more computing systems to display the proposed vendor payment plan to one or more users associated with the business that have approval authority on a display device associated with one or more computing systems accessible by the one or more users;

using one or more processors associated with one or more computing systems to provide one or more of the one or more users associated with the business that have approval authority the capability to edit and/or approve at least part of the proposed vendor payment plan; and once the proposed vendor payment plan is approved by one or more specified users of the one or more users associated with the business that have approval authority, using one or more processors associated with one or more computing systems to make one or more payments to one or more vendors to the business for one or more of the one or more invoices from the one or more vendors to the business.

2. The computing system implemented process for accounts payable management of claim 1, wherein;

the user's vendor payment priority criteria include at least one vendor payment priority criterion selected from the group of vendor payment priority criteria consisting of:

the criterion that invoices with the earliest due dates be paid first from the funds available to the business to pay at least part of the one or more invoices from one or more of the one or more vendors to the business;

the criterion that as many invoices as possible be paid from the funds available to the business to pay at least part of the one or more invoices from one or more of the one or more vendors to the business;

the criterion that invoices having early and/or on-time payment discounts be paid first from the funds available to the business to pay at least part of the one or more invoices from one or more of the one or more vendors to the business;

the criterion that invoices having late payment penalties be paid first from the funds available to the business to pay at least part of the one or more invoices from one or more of the one or more vendors to the business;

the criterion that invoices having the largest amount are paid as late as possible, and/or last, from the funds available to the business to pay at least part of the one or more invoices from one or more of the one or more vendors to the business;

the criterion that all invoices be paid as late as possible from the funds available to the business to pay at least part of the one or more invoices from one or more of the one or more vendors to the business;

the criterion that invoices having the highest interest rates on account balances be paid first from the funds available to the business to pay at least part of the one or more invoices from one or more of the one or more vendors to the business;

the criterion that invoices from specified critical vendors be paid first from the funds available to the business to pay at least part of the one or more invoices from one or more of the one or more vendors to the business;

the criterion that invoices for materials and/or services considered critical to the business be paid first from the funds available to the business to pay at least part of the one or more invoices from one or more of the one or more vendors to the business;

the criterion that invoices from specified long-time or loyal vendors be paid first from the funds available to the business to pay at least part of the one or more invoices from one or more of the one or more vendors to the business;

the criterion that invoices for amounts less than a specified percentage of funds available to the business to pay at least part of the one or more invoices from one or more of the one or more vendors to the business be paid first from the funds available to the business to pay at least part of the one or more invoices from one or more of the one or more vendors to the business;

the criterion that invoices from vendors that the business owes the most money be paid first from the funds available to the business to pay at least part of the one or more invoices from one or more of the one or more vendors to the business; and the criterion that invoices from vendors that are the most overdue be paid first from the funds available to the business to pay at least part of the one or more invoices from one or more of the one or more vendors to the business.

3. The computing system implemented process for accounts payable management of claim 1, wherein;

the data associated with one or more vendors to the business includes one or more vendor data selected from the group of vendor data consisting of:

data indicating all materials and/or services supplied to the business by a given vendor;

data indicating how long the business has used a given vendor;

data indicating the due date of all invoices associated with a given vendor;

data indicating the terms of the contract with a given vendor including any early and/or on-time payment discounts;

data indicating the terms of the contract with a given vendor including any late payment penalties;

data indicating the terms of the contract with a given vendor including any interest rates on unpaid account balances;

data indicating the total amount the business owes a given vendor for all outstanding invoices;

data indicating the vendor's address and/or address for making payments to the vendor; and data indicating an account associated with a given vendor where payment funds should be transferred.

4. The computing system implemented process for accounts payable management of claim 1, wherein;

data associated with one or more invoices from one or more of the one or more vendors to the business includes one or more invoice data selected from the group of invoice data consisting of:

data indicating the vendor associated with a given invoice;

data indicating the materials and/or services associated with a given invoice;

data indicating the due date of a given invoice;

data indicating the terms of the contract associated with a given invoice including any early and/or on-time payment discounts;

data indicating the terms of the contract associated with a given invoice including any late payment penalties; and data indicating the terms of the contract associated with a given invoice including any interest rates on unpaid balances.

5. The computing system implemented process for accounts payable management of claim 1, wherein;

the data indicating funds available to the business to pay at least part of the one or more invoices from one or more of the one or more vendors to the business is obtained from a computing system implemented data management system.

6. The computing system implemented process for accounts payable management of claim 1, wherein;

the proposed vendor payment plan including one or more proposed vendor payments prioritized to be as consistent as possible with the user's vendor payment priority criteria includes individual proposed vendor payment listings, further wherein;

each of the individual proposed vendor payment listings includes proposed vendor payment data selected from the group of proposed vendor payment data consisting of:

data indicating a priority of the proposed payment;

data indicating an amount of the proposed payment;

data indicating a proposed payment due date;

data indicating an account through which the proposed payment is to be made;

data indicating a proposed payment method;

data indicating a vendor name associated with the proposed payment;

data indicating the one or more user vendor payment priority criteria used to establish the priority of the proposed payment; and data indicating the approval status of the proposed payment.

7. The computing system implemented process for accounts payable management of claim 1, wherein;

using one or more processors associated with one or more computing systems to display the proposed vendor payment plan to one or more users associated with the business that have approval authority comprises displaying the proposed vendor payment plan to one or more users associated with the business that have approval authority in a user interface display screen on a display device of a computing system.

8. The computing system implemented process for accounts payable management of claim 7, wherein;

the user interface display screen on the display device of the computing system also includes an available funds display that shows the data indicating funds available to the business to pay at least part of the one or more invoices from one or more of the one or more vendors to the business.

9. The computing system implemented process for accounts payable management of claim 7, wherein;

the user interface display screen on the display device of the computing system also includes a vendor payment criteria display showing the one or more vendor payment priority criteria used to generate the displayed proposed vendor payment plan.

10. The computing system implemented process for accounts payable management of claim 7, wherein;

the user interface display screen on the display device of the computing system also includes a calendar display for the period covered by the proposed vendor payment plan, or any other period of time desired.

11. The computing system implemented process for accounts payable management of claim 7, wherein;

the user interface display screen on the display device of the computing system also includes an accounts receivable display showing expected income for the period covered by the proposed vendor payment plan, or any other period of time desired.

12. The computing system implemented process for accounts payable management of claim 7, wherein;

the user interface display screen on the display device of the computing system also includes:

an available funds display that shows the data indicating funds available to the business to pay at least part of the one or more invoices from one or more of the one or more vendors to the business; and a vendor payment criteria display showing the one or more user vendor payment priority criteria used to generate the displayed proposed vendor payment plan.

13. The computing system implemented process for accounts payable management of claim 1, wherein;

the one or more payments to one or more vendors to the business for one or more of the one or more invoices from the one or more vendors to the business are automatically made via paper checks generated based, at least in part, on data from computing system implemented process for accounts payable management.

14. The computing system implemented process for accounts payable management of claim 1, wherein;

the one or more payments to one or more vendors to the business for one or more of the one or more invoices from the one or more vendors to the business are automatically made via electronic funds transfers based, at least in part, on data from computing system implemented process for accounts payable management.

15. The computing system implemented process for accounts payable management of claim 1, wherein;

the one or more payments to one or more vendors to the business for one or more of the one or more invoices from the one or more vendors to the business are automatically made via an automated clearing house based, at least in part, on data from computing system implemented process for accounts payable management.

16. A system for accounts payable management comprising:

a first computing system associated with a financial institution, the first computing system including data associated with a user business' available funds;

a second computing system associated with a user business, the second computing system including data associated a user business and accounts payable by the user business, the second computing system implementing at least part of a process for accounts payable management, the process for accounts payable management including:

obtaining data indicating the user business' vendor payment priority criteria from the second computing system;

obtaining data associated with one or more vendors to the business from the second computing system;

obtaining data associated with one or more invoices from one or more of the one or more vendors to the business from the second computing system;

obtaining data indicating funds available to the business to pay at least part of the one or more invoices from one or more of the one or more vendors to the business from the first computing system;

analyzing the data indicating the user's vendor payment priority criteria, the data associated with one or more vendors to the business, the data associated with one or more invoices from one or more of the one or more vendors to the business, and the data indicating funds available to the business to pay at least part of the one or more invoices from one or more of the one or more vendors to the business;

generating a proposed vendor payment plan based on the analysis of the data indicating the user's vendor payment priority criteria, the data associated with one or more vendors to the business, the data associated with one or more invoices from one or more of the one or more vendors to the business, and the data indicating funds available to the business to pay at least part of the one or more invoices from one or more of the one or more vendors to the business, the proposed vendor payment plan including one or more proposed vendor payments prioritized to be as consistent as possible with the user's vendor payment priority criteria;

displaying the proposed vendor payment plan to one or more users associated with the business that have approval authority on a display device associated with the second computing system;

providing one or more of the one or more users associated with the business that have approval authority the capability to edit and/or approve at least part of the proposed vendor payment plan; and once the proposed vendor payment plan is approved by one or more specified users of the one or more users associated with the business that have approval authority, making one or more payments to one or more vendors to the business for one or more of the one or more invoices from the one or more vendors to the business.

17. The system for accounts payable management of claim 16, wherein;

the user's vendor payment priority criteria include at least one vendor payment priority criterion selected from the group of vendor payment priority criteria consisting of:

the criterion that invoices with the earliest due dates be paid first from the funds available to the business to pay at least part of the one or more invoices from one or more of the one or more vendors to the business;

the criterion that as many invoices as possible be paid from the funds available to the business to pay at least part of the one or more invoices from one or more of the one or more vendors to the business;

the criterion that invoices having early and/or on-time payment discounts be paid first from the funds available to the business to pay at least part of the one or more invoices from one or more of the one or more vendors to the business;

the criterion that invoices having late payment penalties be paid first from the funds available to the business to pay at least part of the one or more invoices from one or more of the one or more vendors to the business;

the criterion that invoices having the largest amount are paid as late as possible, and/or last, from the funds available to the business to pay at least part of the one or more invoices from one or more of the one or more vendors to the business;

the criterion that all invoices be paid as late as possible from the funds available to the business to pay at least part of the one or more invoices from one or more of the one or more vendors to the business;

the criterion that invoices having the highest interest rates on account balances be paid first from the funds available to the business to pay at least part of the one or more invoices from one or more of the one or more vendors to the business;

the criterion that invoices from specified critical vendors be paid first from the funds available to the business to pay at least part of the one or more invoices from one or more of the one or more vendors to the business;

the criterion that invoices for materials and/or services considered critical to the business be paid first from the funds available to the business to pay at least part of the one or more invoices from one or more of the one or more vendors to the business;

the criterion that invoices from specified long-time or loyal vendors be paid first from the funds available to the business to pay at least part of the one or more invoices from one or more of the one or more vendors to the business;

the criterion that invoices for amounts less than a specified percentage of funds available to the business to pay at least part of the one or more invoices from one or more of the one or more vendors to the business be paid first from the funds available to the business to pay at least part of the one or more invoices from one or more of the one or more vendors to the business;

the criterion that invoices from vendors that the business owes the most money be paid first from the funds available to the business to pay at least part of the one or more invoices from one or more of the one or more vendors to the business; and the criterion that invoices from vendors that are the most overdue be paid first from the funds available to the business to pay at least part of the one or more invoices from one or more of the one or more vendors to the business.

18. The system for accounts payable management of claim 16, wherein;
the data associated with one or more vendors to the business includes one or more vendor data selected from the group of vendor data consisting of:
data indicating all materials and/or services supplied to the business by a given vendor;
data indicating how long the business has used a given vendor;
data indicating the due date of all invoices associated with a given vendor;
data indicating the terms of the contract with a given vendor including any early and/or on-time payment discounts;
data indicating the terms of the contract with a given vendor including any late payment penalties;
data indicating the terms of the contract with a given vendor including any interest rates on unpaid account balances;
data indicating the total amount the business owes a given vendor for all outstanding invoices;
data indicating the vendor's address and/or address for making payments to the vendor; and
data indicating an account associated with a given vendor where payment funds should be transferred.

19. The system for accounts payable management of claim 16, wherein;
data associated with one or more invoices from one or more of the one or more vendors to the business includes one or more invoice data selected from the group of invoice data consisting of:
data indicating the vendor associated with a given invoice;
data indicating the materials and/or services associated with a given invoice;
data indicating the due date of a given invoice;
data indicating the terms of the contract associated with a given invoice including any early and/or on-time payment discounts;
data indicating the terms of the contract associated with a given invoice including any late payment penalties; and
data indicating the terms of the contract associated with a given invoice including any interest rates on unpaid balances.

20. The system for accounts payable management of claim 16, wherein;
the data indicating funds available to the business to pay at least part of the one or more invoices from one or more of the one or more vendors to the business is obtained from a computing system implemented data management system.

21. The system for accounts payable management of claim 16, wherein;
the proposed vendor payment plan including one or more proposed vendor payments prioritized to be as consistent as possible with the user's vendor payment priority criteria includes individual proposed vendor payment listings, further wherein;
each of the individual proposed vendor payment listings includes proposed vendor payment data selected from the group of proposed vendor payment data consisting of:
data indicating a priority of the proposed payment;
data indicating an amount of the proposed payment;
data indicating a proposed payment due date;
data indicating an account through which the proposed payment is to be made;
data indicating a proposed payment method;
data indicating a vendor name associated with the proposed payment;
data indicating the one or more user vendor payment priority criteria used to establish the priority of the proposed payment; and
data indicating the approval status of the proposed payment.

22. The system for accounts payable management of claim 16, wherein;
displaying the proposed vendor payment plan to one or more users associated with the business that have approval authority comprises displaying the proposed vendor payment plan to one or more users associated with the business that have approval authority in a user interface display screen on a display device of the second computing system.

23. The system for accounts payable management of claim 22, wherein;
the user interface display screen on the display device of the second computing system also includes an available funds display that shows the data indicating funds available to the business to pay at least part of the one or more invoices from one or more of the one or more vendors to the business.

24. The system for accounts payable management of claim 22, wherein;
the user interface display screen on the display device of the second computing system also includes a vendor payment criteria display showing the one or more vendor payment priority criteria used to generate the displayed proposed vendor payment plan.

25. The system for accounts payable management of claim 22, wherein;
the user interface display screen on the display device of the second computing system also includes a calendar display for the period covered by the proposed vendor payment plan, or any other period of time desired.

26. The system for accounts payable management of claim 22, wherein;

the user interface display screen on the display device of the second computing system also includes an accounts receivable display showing expected income for the period covered by the proposed vendor payment plan, or any other period of time desired.

27. The system for accounts payable management of claim 22, wherein;
the user interface display screen on the display device of the second computing system also includes:
an available funds display that shows the data indicating funds available to the business to pay at least part of the one or more invoices from one or more of the one or more vendors to the business; and
a vendor payment criteria display showing the one or more user vendor payment priority criteria used to generate the displayed proposed vendor payment plan.

28. The system for accounts payable management of claim 16, wherein;
the one or more payments to one or more vendors to the business for one or more of the one or more invoices from the one or more vendors to the business are automatically made via paper checks generated based, at least in part, on data from computing system implemented process for accounts payable management implemented, at least in part, on the second computing system.

29. The system for accounts payable management for accounts payable management of claim 16, wherein;
the one or more payments to one or more vendors to the business for one or more of the one or more invoices from the one or more vendors to the business are automatically made via electronic funds transfers based, at least in part, on data from computing system implemented process for accounts payable management.

30. The system for accounts payable management of claim 16, wherein;
the one or more payments to one or more vendors to the business for one or more of the one or more invoices from the one or more vendors to the business are automatically made via an automated clearing house based, at least in part, on data from computing system implemented process for accounts payable management.

* * * * *

UNITED STATES PATENT AND TRADEMARK OFFICE
CERTIFICATE OF CORRECTION

| | | |
|---|---|---|
| PATENT NO. | : 8,036,987 B1 | Page 1 of 1 |
| APPLICATION NO. | : 12/361386 | |
| DATED | : October 11, 2011 | |
| INVENTOR(S) | : Arno Grbac et al. | |

It is certified that error appears in the above-identified patent and that said Letters Patent is hereby corrected as shown below:

In the Claims

In Column 37, Lines 42-43, Claim 16, between "associated" and "a user business", insert --with--.

Signed and Sealed this
Fifth Day of November, 2013

Teresa Stanek Rea
*Deputy Director of the United States Patent and Trademark Office*